(12) United States Patent
Yamada

(10) Patent No.: US 8,787,760 B2
(45) Date of Patent: Jul. 22, 2014

(54) SERVER DEVICE THAT SETS SECURITY LEVELS IN ACCORDANCE WITH DISTANCES BETWEEN DEVICES, CLIENT DEVICE, COMMUNICATION SYSTEM, INTEGRATED CIRCUIT FOR SERVER CONTROL, INTEGRATED CIRCUIT FOR CLIENT CONTROL, SERVER PROGRAM, CLIENT PROGRAM, METHOD FOR CONNECTING TO A CLIENT DEVICE, METHOD FOR CONNECTING TO A SERVER DEVICE, AND COMMUNICATION SYSTEM CONNECTION METHOD

(75) Inventor: Kazunori Yamada, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 407 days.

(21) Appl. No.: 13/379,138

(22) PCT Filed: Nov. 19, 2010

(86) PCT No.: PCT/JP2010/006805
§ 371 (c)(1),
(2), (4) Date: Dec. 19, 2011

(87) PCT Pub. No.: WO2011/080867
PCT Pub. Date: Jul. 7, 2011

(65) Prior Publication Data
US 2012/0128367 A1    May 24, 2012

(30) Foreign Application Priority Data
Dec. 28, 2009  (JP) ................................. 2009-297982

(51) Int. Cl.
*H04B 10/25*    (2013.01)
(52) U.S. Cl.
USPC .......................................................... 398/67
(58) Field of Classification Search
CPC .................................................. H04B 10/2503
USPC ............................................................ 398/67
See application file for complete search history.

(56) References Cited

U.S. PATENT DOCUMENTS

| 6,623,187 | B1 | 9/2003 | Mihota |
| 2004/0260730 | A1* | 12/2004 | Iwama ........................ 707/104.1 |

(Continued)

FOREIGN PATENT DOCUMENTS

| JP | 2000-261380 | 9/2000 |
| JP | 2004-118488 | 4/2004 |

(Continued)

OTHER PUBLICATIONS

International Search Report issued Feb. 22, 2011 in corresponding International Application No. PCT/JP2010/006805.

*Primary Examiner* — Leslie Pascal
(74) *Attorney, Agent, or Firm* — Wenderoth, Lind & Ponack, L.L.P.

(57) ABSTRACT

A server device includes an information management unit, an optical signal transmission unit, and a service provision unit. The information management unit stores and manages a plurality of types of connection information having different importance levels, respectively, in association with the respective importance levels, the connection information being necessary for connection to a service. The optical signal transmission unit modulates the stored plurality of types of connection information into optical signals, such that a type of connection information stored in association with a higher importance level has a smaller amount of change in light intensity, and transmits the optical signals using a first communication function. The service provision unit provides, when the client device has issued a connection request containing a predetermined type of connection information using a second communication function, a service to the client device using the connection information.

20 Claims, 13 Drawing Sheets

(56) References Cited

U.S. PATENT DOCUMENTS

2008/0072057 A1* 3/2008 Zhang et al. .................. 713/182
2009/0290030 A1 11/2009 Gocho

FOREIGN PATENT DOCUMENTS

| JP | 2008-17301 | 1/2008 |
| WO | 2008/093582 | 8/2008 |

* cited by examiner

| INFORMATION NAME | DEVICE INFORMATION | ADDRESS INFORMATION | AUTHENTICATION INFORMATION |
|---|---|---|---|
| INFORMATION | SERVER A | http://192.168.10.3:9000/service.cgi | ID:7711 Pass:pas7711 |
| IMPORTANCE LEVEL | LOW | MEDIUM | HIGH |

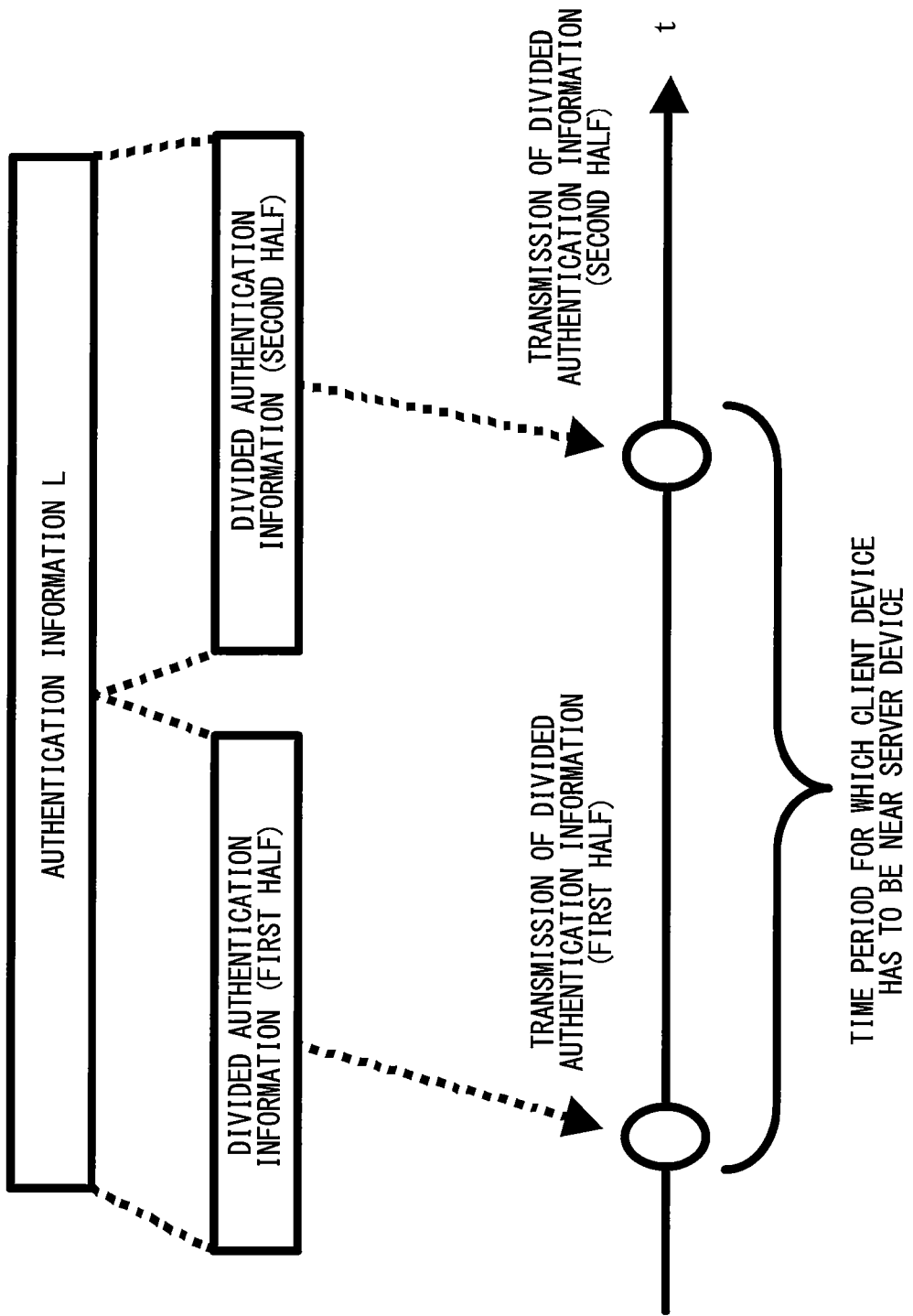
F I G. 8

SERVER DEVICE THAT SETS SECURITY
LEVELS IN ACCORDANCE WITH
DISTANCES BETWEEN DEVICES, CLIENT
DEVICE, COMMUNICATION SYSTEM,
INTEGRATED CIRCUIT FOR SERVER
CONTROL, INTEGRATED CIRCUIT FOR
CLIENT CONTROL, SERVER PROGRAM,
CLIENT PROGRAM, METHOD FOR
CONNECTING TO A CLIENT DEVICE,
METHOD FOR CONNECTING TO A SERVER
DEVICE, AND COMMUNICATION SYSTEM
CONNECTION METHOD

TECHNICAL FIELD

The present invention relates to a communication system having a directional wireless communication function such as optical wireless transmission, and more particularly, to a system for exchanging connection information such as addresses and authentication information, which are needed when devices are to be connected to each other.

BACKGROUND ART

In recent years, many household electrical appliances in houses such as televisions and mobile apparatuses such as mobile phones include communication functions such as wireless LAN (local area network) and Ethernet (registered trademark). By such devices each connecting to a network, cooperative operations between the devices can be attained.

For example, in a case where a mobile apparatus and household electrical appliances in a house are connected to each other, in order that only a proper user is allowed to be connected, a user has to set in advance authentication information such as an ID and a password to all the household electrical appliances in a house. This imposes burdensome operations on the user, which is a problem.

To solve this problem, for example, there is a first method in which a user presses a button provided in a household electrical appliance in a house, a mobile apparatus that has requested connection within a certain period of time is connected without authentication, and authentication information is automatically set, thereby reducing the work of setting authentication information by the user.

However, the first method has a problem in that the security is not ensured for a certain period of time.

Further, in order to solve such a problem, there is a second method in which, a short distance radio and a wireless technology having a high directionality are used to limit the physical distances and directions between the mobile apparatuses and the household electrical appliances in a house, and only a mobile apparatus that has requested connection from the limited area is allowed to be connected without authentication, thereby strengthening the security.

According to the second method, it is possible to configure a connection system in which connection is allowed in a specific area, such as in a room, but connection from the outdoors is not allowed.

Moreover, Patent Literature 1 discloses a technology, in which, for example, the distance between devices is measured at the time when communication is started, and the security strength is changed in accordance with the distance, and especially when the distance between the devices are short, authentication is not required.

CITATION LIST

Patent Literature

[PTL 1] Japanese Laid-Open Patent Publication No. 2008-17301

SUMMARY OF THE INVENTION

Problems to be Solved by the Invention

However, according to the technology of Patent Literature 1, in order to measure the distance between devices, it is necessary to implement a terminal having a high performance such as a function of highly-accurately measuring the time during which a signal is transmitted and received, which results in high costs.

Therefore, an object of the present invention is to provide a server device, client device, communication system, integrated circuit for server control, integrated circuit for client control, server program, client program, method for connecting to a client device, method for connecting to a server device, and communication system connection method, which can change the security strength in accordance with the distance between devices, without requiring implementation of a high-performance terminal.

Solution to the Problems

The present invention is directed to a server device, client device, communication system, integrated circuit for server control, integrated circuit for client control, server program, client program, method for connecting to a client device, method for connecting to a server device, and communication system connection method. In order to solve the above problems, the server device of the present invention includes a server device that provides a service to a client device, an information management unit, an optical signal transmission unit, and a service provision unit.
The information management unit stores and manages a plurality of types of connection information which have different importance levels, respectively, in association with the respective importance levels, the connection information being necessary for connection to a service provided by the server device. The optical signal transmission unit modulates the plurality of types of connection information stored in the information management unit into optical signals, such that a type of connection information stored in association with a higher importance level has a smaller amount of change in light intensity, and transmits the optical signals by use of a first communication function.
The service provision unit has an automatic authentication function which performs automatic authentication when the client device has issued a connection request containing a predetermined type of connection information among the plurality of types of connection information by use of a second communication function which is different from the first communication function, the automatic authentication being for providing the service to the client device by use of the connection information.

Preferably, in the server device, the predetermined type of connection information may be authentication information necessary for authentication when the service is to be provided, and when the client device has issued a connection request not containing the authentication information by use of the second communication function which is different from the first communication function, the service provision unit may request the authentication information from the client device before providing the service, and may receive the authentication information from the client device.

Preferably, in the server device, one of the plurality of types of connection information may be connection destination specifying information necessary for specifying a server device to which the client device is to be connected, the connection request from the client device may be issued to the server device specified based on the connection destination specifying information, and the information management unit may store the authentication information in association with a higher importance level than that of the connection destination specifying information.

Preferably, in the server device, the optical signal transmission unit may allot a transmission section for each of the plurality of types of connection information, and may transmit reference light having a maximum intensity that can be outputted at the beginning of each transmission section.

Preferably, in the server device, the optical signal transmission unit may divide each of the plurality of types of connection information, and may transmit pieces of information obtained by the division at delayed timings.

Preferably, in the server device, the information management unit further may change the plurality of types of connection information periodically or not periodically, when the information management unit has changed the plurality of types of connection information, the optical signal transmission unit may modulate the changed plurality of types of connection information into optical signals such that a type of connection information stored in association with a higher importance level has a smaller amount of change in light intensity, and may transmit the optical signals by use of the first communication function, and in a case where within a predetermined time period since the optical signal transmission unit has outputted the changed plurality of types of connection information, the client device provided with the service does not issue a connection request containing a predetermined type of connection information among the changed plurality of types of connection information, the service provision unit may stop the provision of the service.

Moreover, in order to solve the above problems, the client device of the present invention includes a client device that receives provision of a service from a server device, and includes a connection information acquisition unit, and a service use unit. The connection information acquisition unit receives optical signals by use of a first communication function, the optical signals having been obtained by the server device modulating a plurality of types of connection information which have different importance levels, respectively, the connection information being necessary for connection to a service provided by the server device, such that a type of connection information associated with a higher importance level has a smaller amount of change in light intensity, demodulates the received optical signals, and attempts to acquire the plurality of types of connection information. The service use unit transmits, when the connection information acquisition unit has acquired a predetermined type of connection information, a connection request containing the predetermined type of connection information to the server device by use of a second communication function which is different from the first communication function, and receives the provision of the service.

Preferably, in the client device, the predetermined type of connection information may be authentication information which is necessary for authentication when the provision of the service is to be received, in a case where the connection information acquisition unit has acquired the connection destination specifying information and has failed to acquire the authentication information, the service use unit may transmit a connection request not containing the authentication information to a server device specified based on the connection destination specifying information, may cause an authentication operation to be performed by a user, and may receive the provision of the service.

Preferably, in the client device, one of the plurality of types of connection information may be a connection destination specifying information which is necessary for specifying a server device to which the client device is to be connected, the authentication information may be associated with a higher importance level than that of the connection destination specifying information, and in a case where the connection information acquisition unit has acquired the connection destination specifying information and the authentication information, the service use unit may transmit a connection request containing the authentication information to a server device specified based on the connection destination specifying information.

Preferably, in the client device, the optical signals received by the connection information acquisition unit may be allotted with transmission sections, respectively, according to the respective plurality of types of connection information, and reference light having a maximum intensity that can be outputted by the server device may be transmitted at the beginning of each transmission section, and the connection information acquisition unit may calculate a resolution of each transmission section based on the ratio of the intensity of the reference light to the intensity of subsequent optical signals.

Preferably, in the client device, in a case where the connection information acquisition unit attempts to acquire the plurality of types of connection information, if the demodulated pieces of connection information are divided pieces of connection information, the connection information acquisition unit may retain the demodulated pieces of connection information until receiving all of the pieces of connection information, and then may couple corresponding pieces.

Preferably, in the client device, the plurality of types of connection information may be changed periodically or not periodically, and in a case where the connection information acquisition unit has acquired a predetermined type of connection information while the provision of the service is being received, the service use unit may transmit a connection request containing the predetermined type of connection information to the server device by use of the second communication function.

Moreover, in order to solve the above problems, the communication system of the present invention is a communication system that includes a server device and a client device, and in which a service is provided from the server device to the client device. The server device includes an information management unit, an optical signal transmission unit, and a service provision unit. The client device includes a connection information acquisition unit and a service use unit. The information management unit stores and manages a plurality of types of connection information which have different importance levels, respectively, in association with the respective importance levels, the connection information being necessary for connection to a service provided by the server device. The optical signal transmission unit modulates the plurality of types of connection information stored in the information management unit into optical signals, such that a type of connection information stored in association with a higher importance level has a smaller amount of change in light intensity, and transmits the optical signals by use of a first communication function. The service provision unit has an automatic authentication function which performs automatic authentication when the client device has issued a connection request containing a predetermined type of connection information among the plurality of types of connection information by use of a second communication function which is different from the first communication function, the automatic authentication being for providing the service to the client device by use of the connection information. The connection information acquisition unit receives optical signals outputted by the optical signal transmission unit included in the server device by use of the first communication function, demodulates the received optical signals, and attempts to acquire the plurality of types of connection information. The service use unit transmits, when the connection information acquisition unit has acquired the predetermined type of connection information, a connection request containing the predetermined type of connection information to the server device by use of the second communication function, and receives the provision of the service.

Moreover, in order to solve the above problems, the integrated circuit for server control of the present invention is an integrated circuit configured to be used by a server control that provides a service to a client device, and integrates circuits functioning as an information management unit, an optical signal transmission unit, and a service provision unit. The information management unit manages a plurality of types of connection information which have different importance levels, respectively, in association with the respective importance levels, the connection information being necessary for connection to a service provided by the server device. The optical signal transmission unit modulates the plurality of types of connection information managed by the information management unit into optical signals, such that a type of connection information stored in association with a higher importance level has a smaller amount of change in light intensity, and transmits the optical signals by use of a first communication function. The service provision unit has an automatic authentication function which performs automatic authentication when the client device has issued a connection request containing a predetermined type of connection information among the plurality of types of connection information by use of a second communication function which is different from the first communication function, the automatic authentication being for providing the service to the client device by use of the connection information.

Moreover, in order to sole the above problems, the integrated circuit for client control of the present invention is an integrated circuit for client control configured to be used by a client device that receives provision of a service from a server device, and integrates circuits functioning as a connection information acquisition unit and a service use unit. The connection information acquisition unit receives optical signals by use of a first communication function, the optical signals having been obtained by the server device modulating a plurality of types of connection information which have different importance levels, respectively, the connection information being necessary for connection to a service provided by the server device, such that a type of connection information associated with a higher importance level has a smaller amount of change in light intensity, demodulates the received optical signals, and attempts to acquire the plurality of types of connection information. The service use unit transmits, when the connection information acquisition unit has acquired a predetermined type of connection information, a connection request containing the predetermined type of connection information to the server device by use of a second communication function which is different from the first communication function, and receives the provision of the service.

Moreover, in order to sole the above problems, the server program of the present invention is a server program configured to be executed by a server device that provides a service to a client device, and causes the server device to perform an information management step, an optical signal transmission step, and a service provision step. The information management step manages a plurality of types of connection information which have different importance levels, respectively, in association with the respective importance levels, the connection information being necessary for connection to a service provided by the server device. The optical signal transmission step modulates the plurality of types of connection information managed in the information management step into optical signals, such that a type of connection information stored in association with a higher importance level has a smaller amount of change in light intensity, and transmits the optical signals by use of a first communication function. The service provision step has an automatic authentication function which performs automatic authentication when the client device has issued a connection request containing a predetermined type of connection information among the plurality of types of connection information by use of a second communication function which is different from the first communication function, the automatic authentication being for providing the service to the client device by use of the connection information.

Moreover, in order to sole the above problems, the client program of the present invention is a client program configured to be executed by a client device that receives provision of a service from a server device, and causes the client device to perform a connection information acquisition step and a service use step. The connection information acquisition step receives optical signals by use of a first communication function, the optical signals having been obtained by the server device modulating a plurality of types of connection information which have different importance levels, respectively, the connection information being necessary for connection to a service provided by the server device, such that a type of connection information associated with a higher importance level has a smaller amount of change in light intensity, demodulates the received optical signals, and attempts to acquire the plurality of types of connection information. The service use step transmits, when the connection information acquisition step has acquired a predetermined type of connection information, a connection request containing the predetermined type of connection information to the server device by use of a second communication function which is different from the first communication function, and receives the provision of the service.

Moreover, in order to sole the above problems, the method for connecting to a client device of the present invention is a method for connecting to a client device performed by a server device that provides a service to a client device, and includes an information management step, an optical signal transmission step, and a service provision step. The information management step manages a plurality of types of connection information which have different importance levels, respectively, in association with the respective importance levels, the connection information being necessary for connection to a service provided by the server device. The optical signal transmission step modulates the plurality of types of connection information managed in the information management step into optical signals, such that a type of connection information stored in association with a higher importance level has a smaller amount of change in light intensity, and transmits the optical signals by use of a first communication function. The service provision step has an automatic authentication function which performs automatic authentication when the client device has issued a connection request containing a predetermined type of connection information among the plurality of types of connection information by use of a second communication function which is different from the first communication function, the automatic authentication being for providing the service to the client device by use of the connection information.

Moreover, in order to sole the above problems, the method for connecting to a server device of the present invention is a method for connecting to a server device performed by a client device that receives provision of a service from a server device, and includes a connection information acquisition step and a service use step. The connection information acquisition step receives optical signals by use of a first communication function, the optical signals having been obtained by the server device modulating a plurality of types of connection information which have different importance levels, respectively, the connection information being necessary for connection to a service provided by the server device, such that a type of connection information associated with a higher importance level has a smaller amount of change in light intensity, demodulates the received optical signals, and attempts to acquire the plurality of types of connection information. The service use step transmits, when the connection information acquisition step has acquired a predetermined type of connection information, a connection request containing the predetermined type of connection information to the server device by use of a second communication function which is different from the first communication function, and receives the provision of the service.

Moreover, in order to solve the above problems, the connection method in a communication system of the present invention is a connection method in a communication system that includes a server device and a client device and in which a service is provided from the server device to the client device, and includes an information management step, and optical signal transmission step, a service provision step, a connection information acquisition step, and a service use step. The information management step, performed in the server device, manages a plurality of types of connection information which have different importance levels, respectively, in association with the respective importance levels, the connection information being necessary for connection to a service provided by the server device. The optical signal transmission step, performed in the server device, modulates the plurality of types of connection information managed in the information management step into optical signals, such that a type of connection information stored in association with a higher importance level has a smaller amount of change in light intensity, and transmits the optical signals by use of a first communication function. The service provision step, performed in the server device, has an automatic authentication function which performs automatic authentication when the client device has issued a connection request containing a predetermined type of connection information among the plurality of types of connection information by use of a second communication function which is different from the first communication function, the automatic authentication being for providing the service to the client device by use of the connection information. The connection information acquisition step, performed in the client device, receives optical signals outputted by an optical signal transmission unit included in the server device by use of the first communication function, demodulates the received optical signals, and attempts to acquire the plurality of types of connection information. The service use step, performed in the client device, transmits, when the connection information acquisition step has acquired a predetermined type of connection information, a connection request containing the predetermined type of connection information to the server device by use of the second communication function, and receives the provision of the service.

Advantageous Effects of the Invention

As described above, in the present invention, it is possible to change the type of connection information that the client device can acquire in accordance with the distance between the server device and the client device, based on the importance level of the connection information. Therefore, it is possible to change the security strength in accordance with the distance among devices without requiring implementation of a high-performance terminal.

Further, a plurality of types of authentication information are each divided to be transmitted. Therefore, only when the client device is near the server device until receiving all pieces of the authentication information, the client device can be automatically authenticated. Therefore, it is possible to improve the security.

Further, since the plurality of types of connection information is updated, only when a server device and a client device are always within a certain distance from each other and in a state where the client device can acquire authentication information through optical wireless communication, the client device can receive a service provided by the server device via a wireless LAN. Therefore, it is possible to improve the security.

BRIEF DESCRIPTION OF THE DRAWINGS

FIG. 8 is a schematic diagram showing optical signals outputted by a server device 300 according to the second embodiment.

DESCRIPTION OF EMBODIMENTS

First Embodiment

<Outline>

In a first embodiment, by using the fact that a light intensity is attenuated depending on a distance, a server device modulates types of information having different priorities, respectively, into optical signals having different amounts of change in light intensity and outputs the resultant optical signals. This allows authentication information or the like having a higher priority to be received only by client devices near the server device, and such client devices use the received information to access the server device, by using another communication function. Thus, the client devices near the server device can receive provision of a service without preparing authentication information, and client devices further from the server device cannot receive provision of a service unless an authentication operation is performed. This improves convenience for users while ensuring security, without requiring implementation of a high-performance terminal.

<Configuration>

Figure 1:
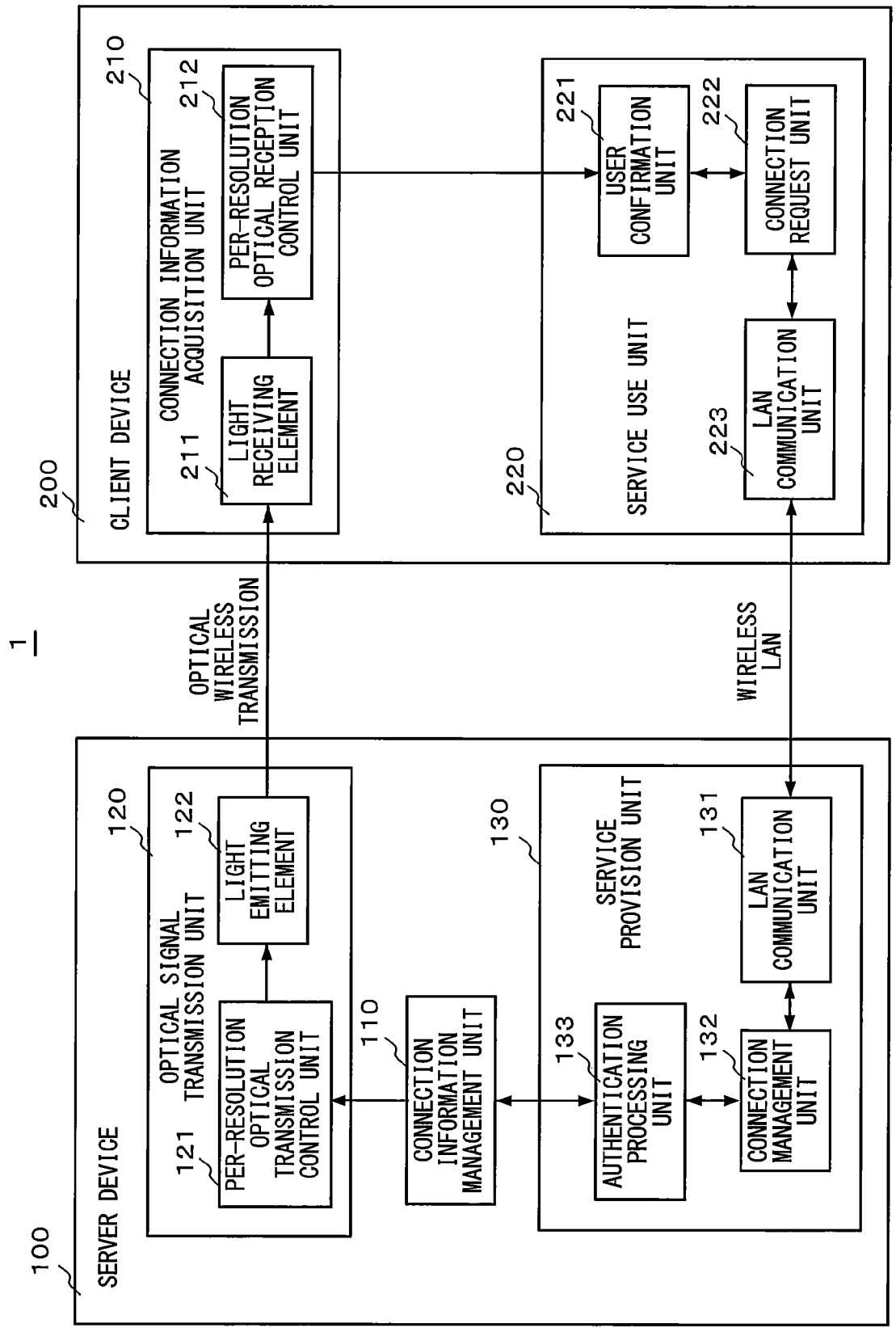
FIG. 1 shows a configuration of a communication system 1 according to a first embodiment.

FIG. 1 shows a configuration of a communication system 1 according to a first embodiment.

The communication system 1 shown in FIG. 1 includes one or more server devices 100 and one or more client devices 200.

The server device 100 is a device such as a computer that provides a service such as distribution of contents via a network, and communicates with an external device using two different communication functions. A first communication function in the server device 100 is a transmission function using optical wireless transmission, and a second communication function is a transmission and reception function using a wireless LAN. Moreover, the server device is connected by means of wireless LAN to a communication network using an IP (Internet Protocol).

The client device 200 is a device that can receive provision of various services from the server device 100, and communicates with an external device using two different communication functions, similarly to the server device 100. The first communication function in the client device 200 is a reception function using optical wireless transmission and the second communication function is a transmission and reception function using a wireless LAN.

Here, the server device 100 includes a connection information management unit 110, an optical signal transmission unit 120, and a service provision unit 130.

The connection information management unit 110 stores and manages a plurality of types of connection information which have different importance levels, respectively, associated with the respective importance levels, the connection information being necessary for connection to a service provided by the server device 100.

Figures 2, 3:
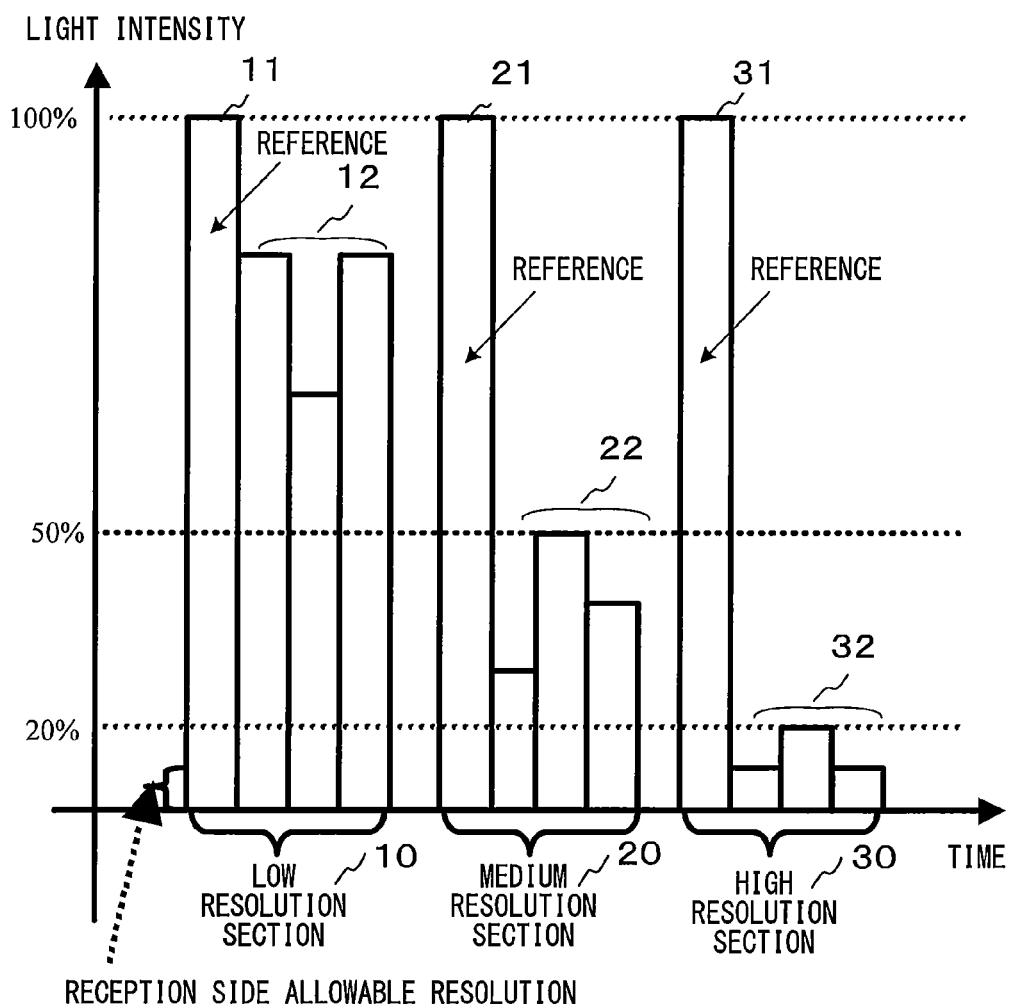
FIG. 2 shows an example of connection information which is retained in and managed by a connection information management unit 110.
FIG. 3 is a schematic diagram showing optical signals outputted by a per-resolution optical transmission control unit 121.

FIG. 2 shows an example of connection information retained and managed by the connection information management unit 110.

The plurality of types of connection information shown in FIG. 2 include three types of information which have different importance levels, respectively, that is, device information, address information, and authentication information. Each of the device information and the address information is connection destination specifying information necessary for specifying a server device to which a client device is connected. The device information is a server name named by a user, and here, named as "Server A", and stored in association with an importance level "low". The address information is information indicating the IP address of the server device 100 and the address of a service to be provided. Here, the address information is "http://192.168.10.3:9000/service.cgi", which is an address of the server-side service using an http (hypertext transfer protocol). The address information is stored in association with an importance level "medium". Here, the server device 100 has a function of providing a service such as a Web server function or a content distribution function in a connection mode using the http. The contents of the service may be any contents as long as they can be provided by use of the second communication function.

The authentication information is an ID (identifier) and a password which are necessary for connection to a service provided by the server device 100, and is "ID: 7711, password: pas7711", here. If the authentication information is leaked, anyone can connect to the service. Thus, the authentication information is high-confidentiality information. Therefore, the importance level is set to "high", and is stored in association with a highest importance level.

In FIG. 2, there are three importance levels, and an example of three types of connection information is shown. However, the number of importance levels may be any number, and also the number of types of the connection information may be any number. Further, although the authentication information has to be associated with a certain high level of importance, the level may not be necessarily the highest level of importance.

The optical signal transmission unit 120 includes a per-resolution optical transmission control unit 121, and a light emitting element 122. Based on a data modulation method performed in accordance with resolutions, the per-resolution optical transmission control unit 121 modulates the plurality of types of connection information stored in the connection information management unit 110 into optical signals, such that a type of connection information stored in association with a higher importance level has a smaller amount of change in light intensity. The light emitting element 122 transmits the modulated optical signals by use of the first communication function. Here, the light emitting element 122 is a light emitting diode, for example, and driven by the per-resolution optical transmission control unit 121.

Generally, in an optical wireless technology, a light intensity is changed in a constant cycle by use of an AM modulation (amplitude modulation) technology, and then digital information is transmitted.

FIG. 3 is a schematic diagram showing optical signals modulated by use of an AM modulation technology as in a conventional method and outputted, by the per-resolution optical transmission control unit 121. In FIG. 3, the vertical axis represents light intensity, and the horizontal axis represents time.

With reference to FIG. 3, optical signals are outputted in three transmission sections, that is, a low resolution section 10, a medium resolution section 20, a high resolution section 30, as shown in FIG. 2, starting at a lower importance level connection information, in an ascending order. Here, three transmission sections are provided. However, since the number of transmission sections is determined in accordance with the number of levels of importance, transmission sections are allotted to the respective types of connection information having respective different importance levels.

In the low resolution section 10 in FIG. 3, an optical output 11 is firstly transmitted, which serves as reference light and has a maximum intensity that can be outputted. Then, an optical output 12 is transmitted, which is obtained by performing a lower resolution modulation for realizing a large amount of change in light intensity, on the lower-resolution-use device information associated with the importance level "low" shown in FIG. 2, for example. Similarly in the next medium resolution section 20, an optical output 21 is firstly transmitted, which serves as a reference and has a maximum intensity that can be outputted. Then, an optical output 22 is transmitted, which is obtained by performing a medium resolution modulation for realizing a medium amount of change in light intensity, on the medium-resolution-use address information associated with the "medium" importance level shown in FIG. 2, for example. Similarly in the next high resolution section 30, an optical output 31 is firstly transmitted, which serves a reference and has a maximum intensity that can be outputted. Then, an optical output 32 is transmitted, which is obtained by performing a high resolution modulation for realizing a small amount of change in light intensity, on the high-resolution-use authentication information associated with the importance level "high" shown in FIG. 2, for example.

It should be noted that the reference light is not necessarily firstly transmitted for each resolution section. Alternatively, a header is provided in each resolution section, and section information such as an importance level and a resolution may be provided to this header.

As described above, the server device 100 according to the first embodiment can perform different resolution modulations on the plurality of types of connection information which have different importance levels, respectively, and which are in transmission sections of different importance levels, respectively, and transmit the modulated connection information.

Moreover, the per-resolution optical transmission control unit 121 monitors a change of the state into, for example, a predetermined state where the wireless LAN communication unit has become communicable by the actuation of the power source or the like. Thus, the per-resolution optical transmission control unit 121 detects the state where a service can be provided, and repeatedly transmits the information of the low resolution section 10, the information of the medium resolution section 20, and the information of the high resolution section 30 in this order, in a predetermined cycle.

The service provision unit 130 includes a LAN communication unit 131, a connection management unit 132, and an authentication processing unit 133, and provides a predetermined service to a client device 200 that has been authenticated.

The LAN communication unit 131 has a general transmission and reception function by a wireless LAN, is a communication device that processes a PHY layer (Physical Layer) and a MAC layer (Media Access Control Layer) of the wireless LAN, and transmits and receives data via the wireless LAN to and from a client device 200.

The connection management unit 132 determines whether data received from a client device 200 by the wireless LAN communication unit 131 is a connection request for connecting to a service provided by its own terminal. If the data is not the connection request, the connection management unit 132 discards the data. If the data is the connection request, the connection management unit 132 further determines whether the connection request contains authentication information. If the connection request contains the authentication information, in order to cause the authentication processing unit 133 to perform automatic authentication for providing the service to the client device 200 using the authentication information, the connection management unit 132 passes the authentication information to the authentication processing unit 133 for performing the authentication. If the connection request does not contain the authentication information, the connection management unit 132 receives an authentication operation by a user.

Here, the connection request is a request such as, for example, a general GET (one of requests that request a service in HTTP) using an HTTP. By adding an ID, a password, and the like to HTTP header information, the authentication information can be included in the connection request. It should be noted that the connection request is not limited to HTTP, and may be any communication protocol, such as SOAP, that can be used by use of the second communication function.

The authentication processing unit 133 compares the authentication information included in the connection request or the authentication information received through an authentication operation by the user, with the authentication information retained and managed by the connection information management unit 110. If they coincide with each other, the authentication processing unit 133 notifies the connection management unit 132 of a success of the authentication, and if they do not coincide with each other, the authentication processing unit 133 notifies the connection management unit 132 of a failure of the authentication.

Upon receiving the notification of the authentication success from the authentication processing unit 133, the connection management unit 132 provides the service to the client device 200. Upon receiving the notification of the failure, the connection management unit 132 notifies the client device 200 of the failure.

The client device 200 includes a connection information acquisition unit 210 and a service use unit 220.

The connection information acquisition unit 210 includes a light receiving element 211 and a per-resolution optical reception control unit 212. The light receiving element 211 receives optical signals modulated by use of an optical wireless technology, converts the modulated optical signals into electric signals. The per-resolution optical reception control unit 212 determines resolution sections based on the intensity of the electric signals obtained here, and demodulates the electric signals for the respective resolution sections, thereby attempting acquisition of the plurality of types of connection information. Here, the light receiving element 211 is a photo diode, for example.

Here, the reference light having the maximum intensity that the server device 100 can output is firstly transmitted in each resolution section. Therefore, the resolution for each resolution section can be calculated based on the ratio of the intensity of the reference light to the intensity of subsequent optical signals.

In a case where reference light is not firstly transmitted in each resolution section, section information such as importance level and resolution can be acquired, based on, for example, the receiving order of the signals or the number of optical signals. Further, if section information such as importance level and resolution is added to the header of each resolution section, the importance level, resolution, and the like can be acquired with reference to the header.

The service use unit 220 includes a user confirmation unit 221, a connection request unit 222, and a LAN communication unit 223. Upon being authenticated by the server device 100, the service use unit 220 can receive provision of a predetermined service.

The user confirmation unit 221 stores a plurality of types of connection information that has been acquired, compares periodically or not periodically the stored plurality of types of connection information with a plurality of types of connection information acquired by the per-resolution optical reception control unit 212, and determines whether the information has been updated. If the information has been updated, or if new information has been acquired, the user confirmation unit 221 confirms with the user whether to provide the service. Upon acquisition of the confirmation to establish connection, the user confirmation unit 221 notifies the connection request unit 222 to the effect.

It should be noted that the user confirmation unit 221 is not always necessary, and without confirming with the user whether to provide the service, the service may be always provided. Alternatively, the user confirmation unit 221 may not confirm with the user whether to provide the service, but the user may preset a setting whether to provide the service and this setting may be confirmed by the user confirmation unit 221.

Upon receiving the notification of establishing connection from the user confirmation unit 221, the connection request unit 222 generates connection request information based on the connection information acquired by the per-resolution optical reception control unit 212, and transmits the generated connection request information to the target server.

Here, in a case where the server device 100 is not so distanced from the client device 200, all types of connection information are acquired. Therefore, the connection request unit 222 can generate connection request information containing the authentication information acquired in the high resolution section 30, and can transmit the generated connection request information to the server device 100 specified based on the device information and the address information acquired in the low resolution section 10 and the medium resolution section 20, respectively.

Similarly to the LAN communication unit 131, the LAN communication unit 223 includes a general transmission and reception function by a wireless LAN, is a communication device that processes a PHY layer and a MAC layer of the wireless LAN, and transmits and receives data via the wireless LAN to and from a server device 100.

Meanwhile, in a case where the server device 100 is sufficiently distanced from the client device 200, no connection information is acquired, and thus, the client device 200 does not know a transmission destination. Therefore, unless the user separately inputs or the like all the information that specifies the server device 100 to the client device 200, the client device 200 cannot transmit connection request information.

Moreover, in a case where the server device 100 is distanced from the client device 200 to a certain extent, information is acquired only in the low resolution section 10 or only in the low resolution section 10 and the medium resolution section 20.

When information is acquired only in the low resolution section 10, the client device 200 can have the device information only, notify the monitor and the like the device information, and urge the user to input address information for the service.

When information is acquired only in the low resolution section 10 and the medium resolution section 20, the connection request unit 222 can generate connection request information not containing authentication information, and can transmit the generated connection request information toward a server device 100 specified based on the device information and the address information acquired in the low resolution section 10 and the medium resolution section 20, respectively.

Figure 4:
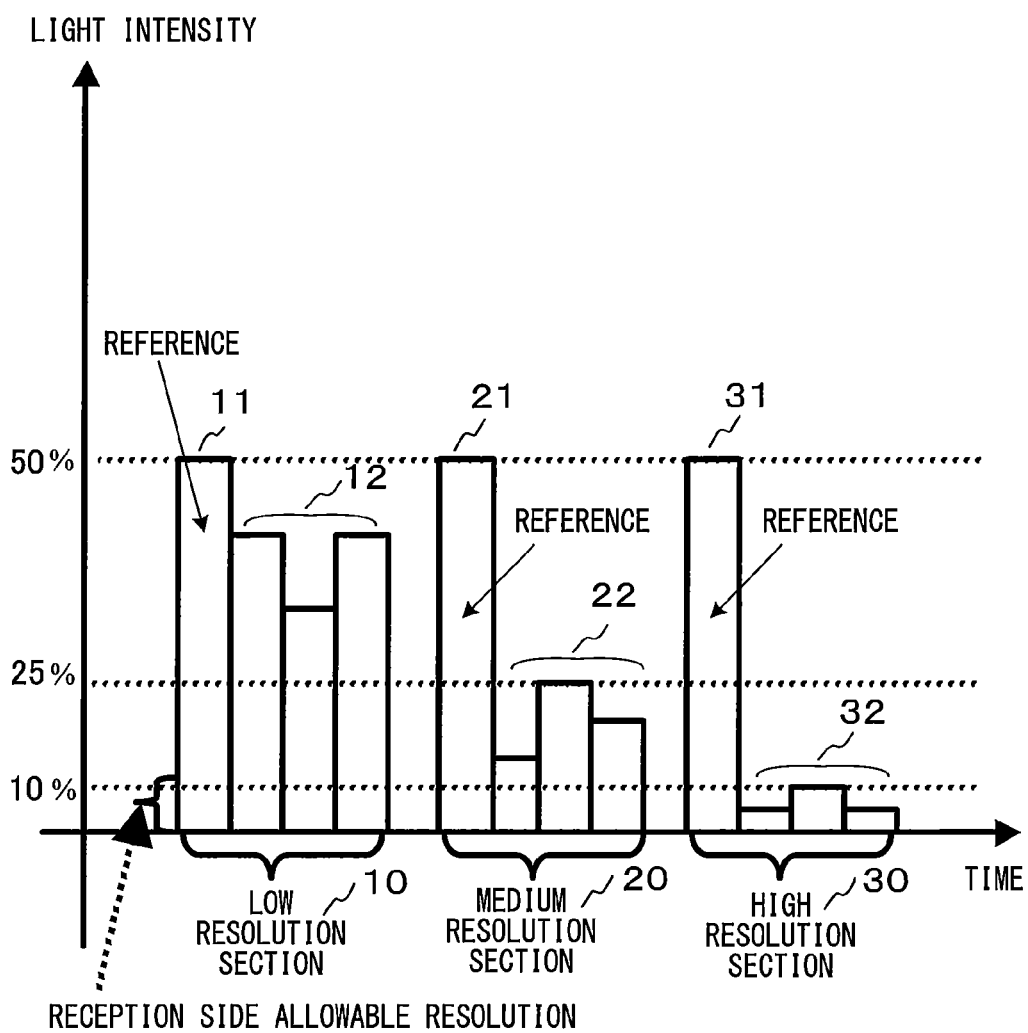
FIG. 4 is a schematic diagram showing optical signals received by a connection information acquisition unit 210 in a case where a server device 100 is distanced from a client device 200 to a certain extent.

FIG. 4 is a schematic diagram showing optical signals received by the connection information acquisition unit 210 in a case where the server device 100 is distanced from the client device 200 to a certain extent.

When the overall light intensity is reduced and the amount of change in the intensity of the portion of the light that represents information becomes smaller than the allowable resolution on the reception side, the information cannot be read. In the example of FIG. 4, the information of the high resolution section cannot be acquired.

<Operation>

Figure 5:
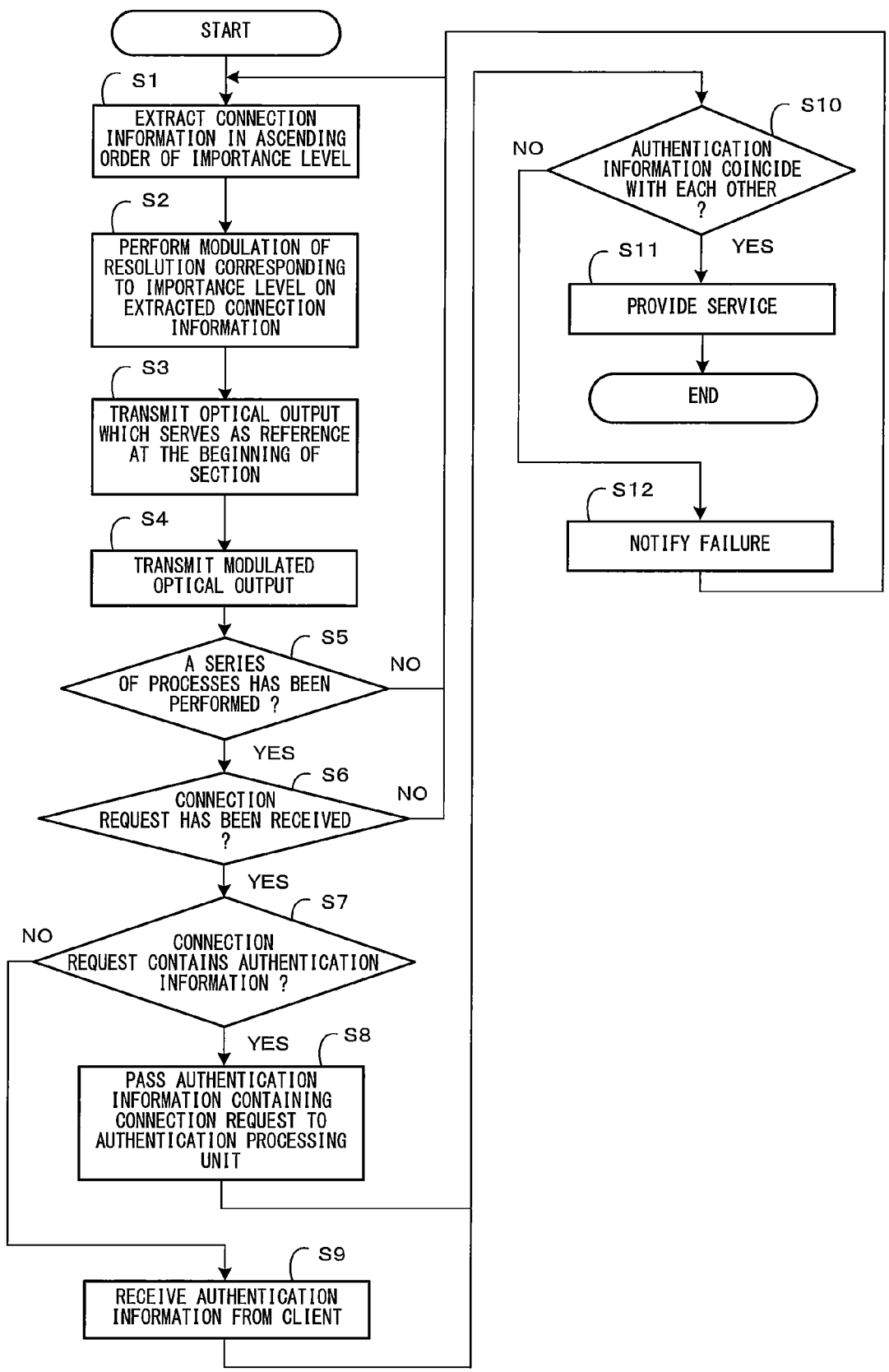
FIG. 5 shows a flow of a series of processes performed by the server device 100, that is, generating connection information, transmitting it, receiving connection request information, and providing a service.

FIG. 5 shows a flow of a series of processes performed by the server device 100, that is, generating connection information, transmitting it, receiving connection request information, and providing a service.

(1) The per-resolution optical transmission control unit 121 extracts connection information in an ascending order of importance level from the connection information management unit 110 (step S1). After extracting connection information having the highest importance level, the per-resolution optical transmission control unit 121 starts extracting connection information starting at the lowest importance level again.

(2) Modulation of a resolution corresponding to the importance level is performed on the extracted connection information (step S2).

(3) An optical output which serves as a reference and has a maximum intensity that can be outputted is transmitted at the beginning of the section (step S3).

(4) The modulated optical output is transmitted (step S4).

(5) It is determined whether a series of the above processes have been performed on the connection information having the lowest importance level through the connection information having the highest importance level (step S5). If the series of processes have not been performed for all the importance levels (step S5: NO), the process returns to the beginning to process the next importance level section.

(6) If the series of processes have been performed for all the importance levels (step S5: YES), the connection management unit 132 determines whether a connection request to the service to be provided by the own terminal has been received (step S6). If the connection request has not been received (step S6: NO), the process returns to the beginning.

(7) If the connection request has been received (step S6: YES), it is determined whether the connection request contains authentication information (step S7).

(8) If the connection request contains the authentication information (step S7: YES), the authentication information is passed to the authentication processing unit (step S8).

(9) If connection request does not contain the authentication information (step S7: NO), authentication information is received from the client (step S9). The server device 100 requests authentication information from the client device 200, and as a response from the client device 200 to this request, the server device 100 receives the authentication information from the client device 200.

(10) The authentication processing unit 133 compares the authentication information contained in the connection request or the authentication information received through an authentication operation by the user, with the authentication information retained and managed by the connection information management unit 110, and determines whether they coincide with each other (step S10).

(11) If they coincide with each other (step S10: YES), the connection management unit 132 provides the service to the client device 200 (step S11).

(12) If they do not coincide with each other (step S10: NO), the connection management unit 132 notifies the client device 200 of the failure, and the process returns to the beginning (step S12).

After step S11, the processes are repeated starting at step S1, whereby transmission of connection information and provision of the service can be continued.

Figure 6:
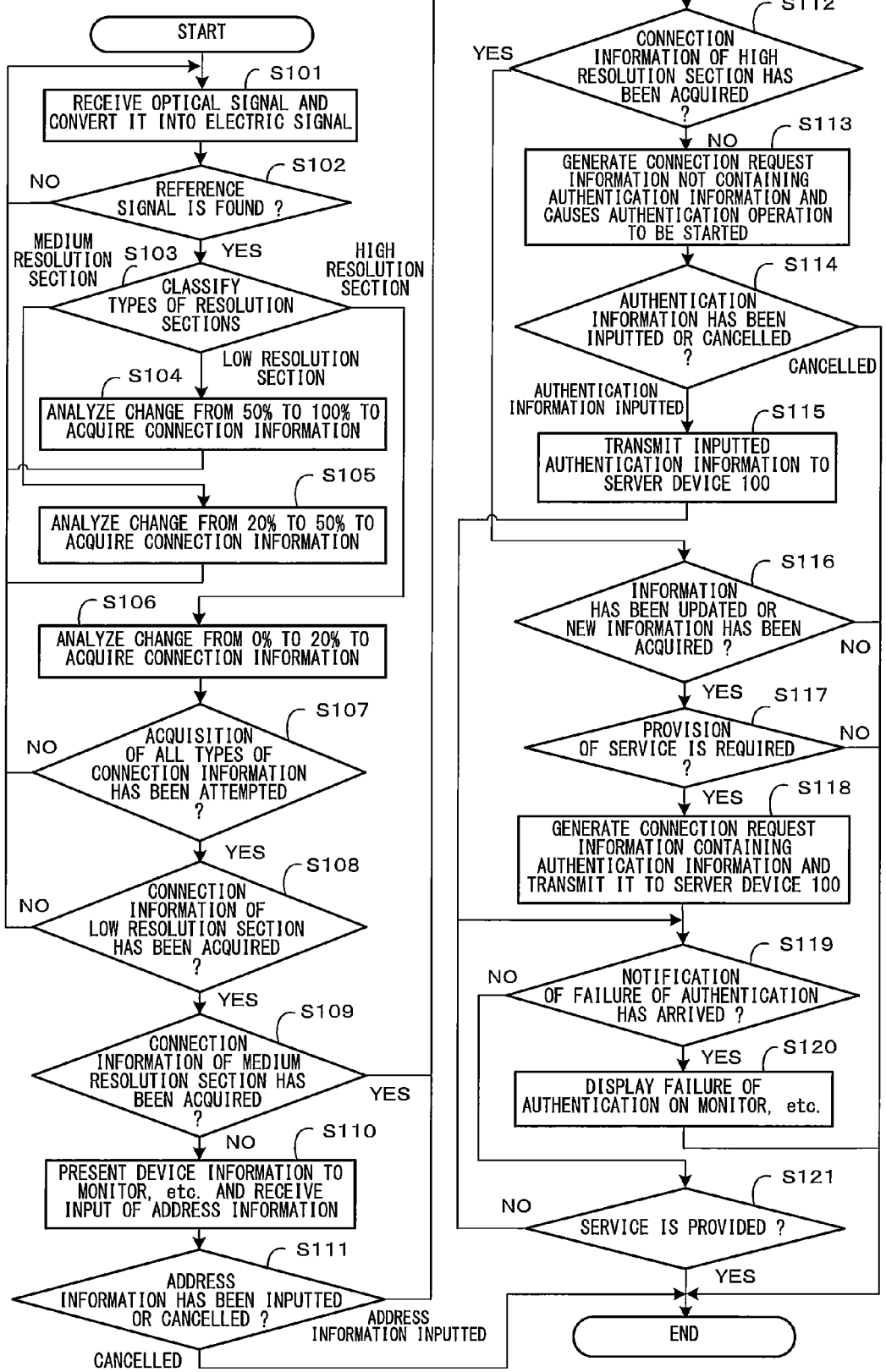
FIG. 6 shows a flow of a series of processes performed by the client device 200, that is, receiving connection information, generating connection request information, transmitting it, and receiving provision of a service.

FIG. 6 shows a flow of a series of processes performed by the client device 200, that is, periodically or not periodically, receiving connection information, generating connection request information, transmitting it, and receiving provision of a service.

(1) The light receiving element 211 receives an optical signal modulated by use of an optical wireless technology, and converts the modulated optical signal into an electric signal (step S101).

(2) The client device 200 waits for the per-resolution optical reception control unit 212 to find a reference signal corresponding to the reference light from the electric signal acquired in step S101 (step S102).

(3) If the reference signal is found (step S102: YES), the per-resolution optical reception control unit 212 confirms the pattern of the received light after the reference signal. If the light intensity in a resolution section is 50% or more of that of the reference signal, the resolution section is determined to be the low resolution section. If the light intensity in a resolution section is 20% to 50% of that of the reference signal, the resolution section is determined to be the medium resolution section. If the light intensity in a resolution section is 20% or less of that of the reference signal, the resolution section is determined to be the high resolution section. In this manner, the types of resolution sections are classified (step S103).

(4) In a case where the resolution section is determined to be the low resolution section, the change in light intensity corresponding to 50% to 100% of the reference light intensity is analyzed, whereby connection information is acquired. If information cannot be acquired due to a change exceeding the resolution limit, or the like, information indicating a failure of acquisition of information in the low resolution section is returned (step S104).

(5) In a case where the resolution section is determined to be the medium resolution section, the change in light intensity corresponding to 20% to 50% of the reference light intensity is analyzed, whereby connection information is acquired. If information cannot be acquired due to a change exceeding the resolution limit, or the like, information indicating a failure of acquisition of information in the medium resolution section is returned (step S105).

(6) In a case where the resolution section is determined to be the high resolution section, the change in light intensity corresponding to 0% to 20% of the reference light intensity is analyzed, whereby connection information is acquired. If information cannot be acquired due to a change exceeding the resolution limit, or the like, information indicating a failure of acquisition of information in the high resolution section is returned (step S106).

(7) It is determined whether acquisition of all the types of connection information has been attempted (step S107).

(8) If acquisition of all the types of the connection information has been attempted (step S107: YES), it is determined whether connection information of the low resolution section has been acquired (step S108). If the acquisition of the connection information in the low resolution section has failed, information regarding the reception for the current round is cleared, and the process returns to the beginning.

(9) If the connection information of the low resolution section has been acquired (step S108: YES), it is determined whether connection information of the medium resolution section has been acquired (step S109).

(10) If the connection information of the medium resolution section has not been acquired (step S109: NO), the device information, which is the connection information of the low resolution section, is presented to the monitor or the like, and an input of the address information is received (step S110).

(11) It is determined whether the address information has been inputted or the input thereof has been cancelled (step S111). In the case of the cancellation, the process ends.

(12) If the connection information of the medium resolution section has been acquired (step S109: YES), it is determined whether the connection information of the high resolution section has been acquired (step S112).

(13) If the connection information of the high resolution section has not been acquired (step S112: NO), or if the address information has been inputted, connection request information not containing the authentication information is generated, and the generated connection request information is transmitted to a server device 100 specified based on the device information being the connection information of the low resolution section and the address information being the connection information of the medium resolution section or the inputted address information, to causes an authentication operation to be started by the user (step S113).

(14) It is determined whether the authentication information has been inputted or the input thereof has been cancelled (step S114). In the case of the cancellation, the process ends.

(15) If the authentication information has been inputted, the inputted authentication information is transmitted to the server device 100 (step S115).

(16) If the connection information of the high resolution section has been acquired (step S112: YES), the user confirmation unit 221 compares the connection information previously acquired with the connection information acquired this time, and determines whether the information has been updated or new information has been acquired (step S116).

(17) If the information has been updated or new information has been acquired (step S116: YES), whether to provide a service is confirmed with the user (step S117).

(18) If provision of the service is required (step S117: YES), connection request information containing authentication information being the connection information of the high resolution section is generated, the generated connection request information is transmitted to a server device 100 specified based on the device information being the connection information of the low resolution section and the address information being the connection information of the medium resolution section (step S118).

(19) The client device 200 waits until a notification indicating a failure of authentication arrives from the server device 100 (step S119).

(20) If the notification indicating the failure of the authentication has arrived (step S119: YES), the notification is displayed on the monitor or the like and the process ends (step S120).

(21) The client device 200 waits for a service to be provided from the server device 100. Upon the provision of the service, the process ends (step S121).

<Summary>

As described above, depending on the distance between the server device 100 and the client device 200, the types of connection information that can be acquired by the client device 200 can be changed, in accordance with the importance level of the connection information. Therefore, security strength can be changed depending on the distance between devices, without requiring implementation of a high-performance terminal.

Second Embodiment

<Outline>

In a second embodiment, each of the plurality of types of connection information is divided, and pieces of information obtained by the division are transmitted at delayed timings with a time interval therebetween, whereby the system is controlled such that a service is not provided unless a server device and a client device are within a certain distance from each other for a predetermined period of time or more, thereby increasing increase the security.

<Configuration>

Figure 7:
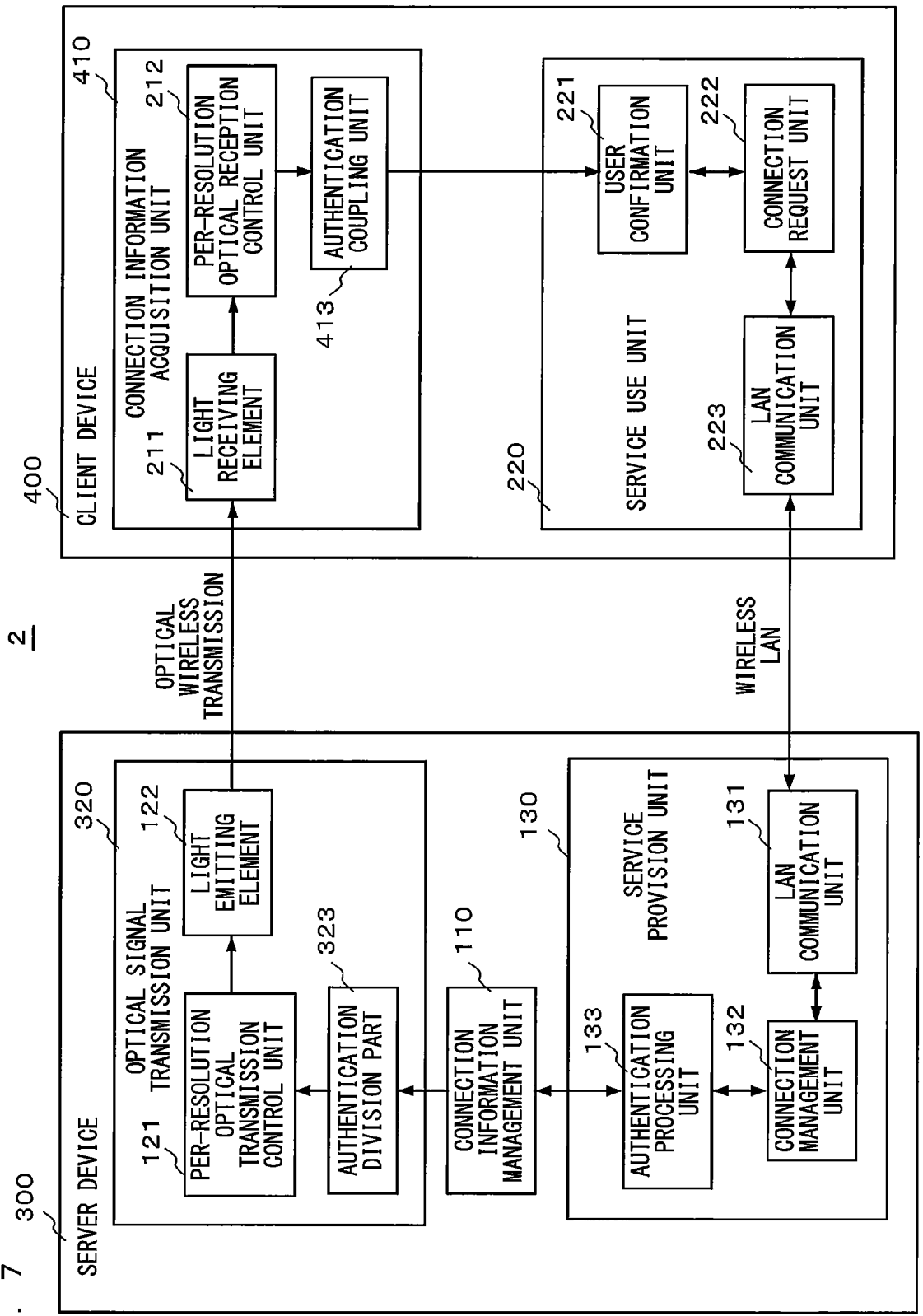
FIG. 7 shows a configuration of a communication system 2 according to a second embodiment.

FIG. 7 shows a configuration of a communication system 2 according to the second embodiment. Here, the same components as in the communication system 1 of the first embodiment shown in FIG. 1 are denoted by the same reference numerals, and description thereof will be omitted.

The communication system 2 shown in FIG. 7 includes one or more server devices 300, one or more client devices 400.

The server device 300 is same as the server device 100 in FIG. 1 except that the optical signal transmission unit 120 is replaced with an optical signal transmission unit 320. The optical signal transmission unit 320 includes an authentication division part 323 in addition to the optical signal transmission unit 120 in FIG. 1.

When the optical signal transmission unit 320 acquires the plurality of types of connection information from the connection information management unit 110, the authentication division part 323 divides each type of connection information obtained from the connection information management unit 110, and passes pieces of information obtained by the division to the per-resolution optical transmission control unit 121 at delayed timings, to be transmitted. Here, the three types of connection information are each divided into two, that is, a first half and a second half. The first halves of the three types of connection information and the second halves of the three types of connection information are alternately passed to the per-resolution optical transmission control unit 121 to be transmitted. Alternatively, a header may be provided in each piece of connection information to include information indicating a first half or a second half, and then the resultant pieces of information may be passed.

The client device 400 is the same as the client device 200 in FIG. 1 except that the connection information acquisition unit 210 is replaced with a connection information acquisition unit 410. The connection information acquisition unit 410 includes an authentication coupling unit 413 in addition to the connection information acquisition unit 210 in FIG. 1.

In a case where the per-resolution optical reception control unit 212 attempts to acquire a plurality of types of connection information, if demodulated pieces of connection information are the divided pieces of connection information, the authentication coupling unit 413 retains the pieces of connection information until receiving all of the pieces of connection information, couples corresponding pieces, and passes the resultant information to the per-resolution optical reception control unit 212.

FIG. 8 is a schematic diagram showing optical signals outputted by the server device 300 of the second embodiment. In FIG. 8, the horizontal axis represents time.

As shown in FIG. 8, the server device 300 controls the transmission interval of connection information (first half) and connection information (second half), which are acquired by dividing connection information L into two. In this manner, a minimum time period for which the client device 400 has to be in a vicinity of the server device 300 can be controlled.

<Summary>

As described above, the server device 300 divides each of the plurality of types of connection information and transmits pieces of connection information obtained by the division. Accordingly, only when the client device 400 is in a vicinity of the server device 300 until all the pieces of authentication information are received, the client device 400 can receive the automatic authentication.

As a result, a client device 400 that has been in a vicinity of the server device 300 for a short period of time or a client device 400 that just passed by cannot know the authentication information. Accordingly, security can be improved.

First Modification Example

In the second embodiment, the authentication information is divided and the pieces of information obtained by the division are transmitted at delayed timings, whereby security is improved. However, in a first modification example, a server device periodically or not periodically changes the authentication information, and each time the authentication information is changed, the authentication information is transmitted by use of the first communication function. In a case where an authentication request containing predetermined authentication information is not received within a time period from a client device, the server device stops provision of a service. In this manner, the system is controlled such that the service is not provided unless the server device and the client device are always within a certain distance from each other, whereby security is improved.

Figure 9:
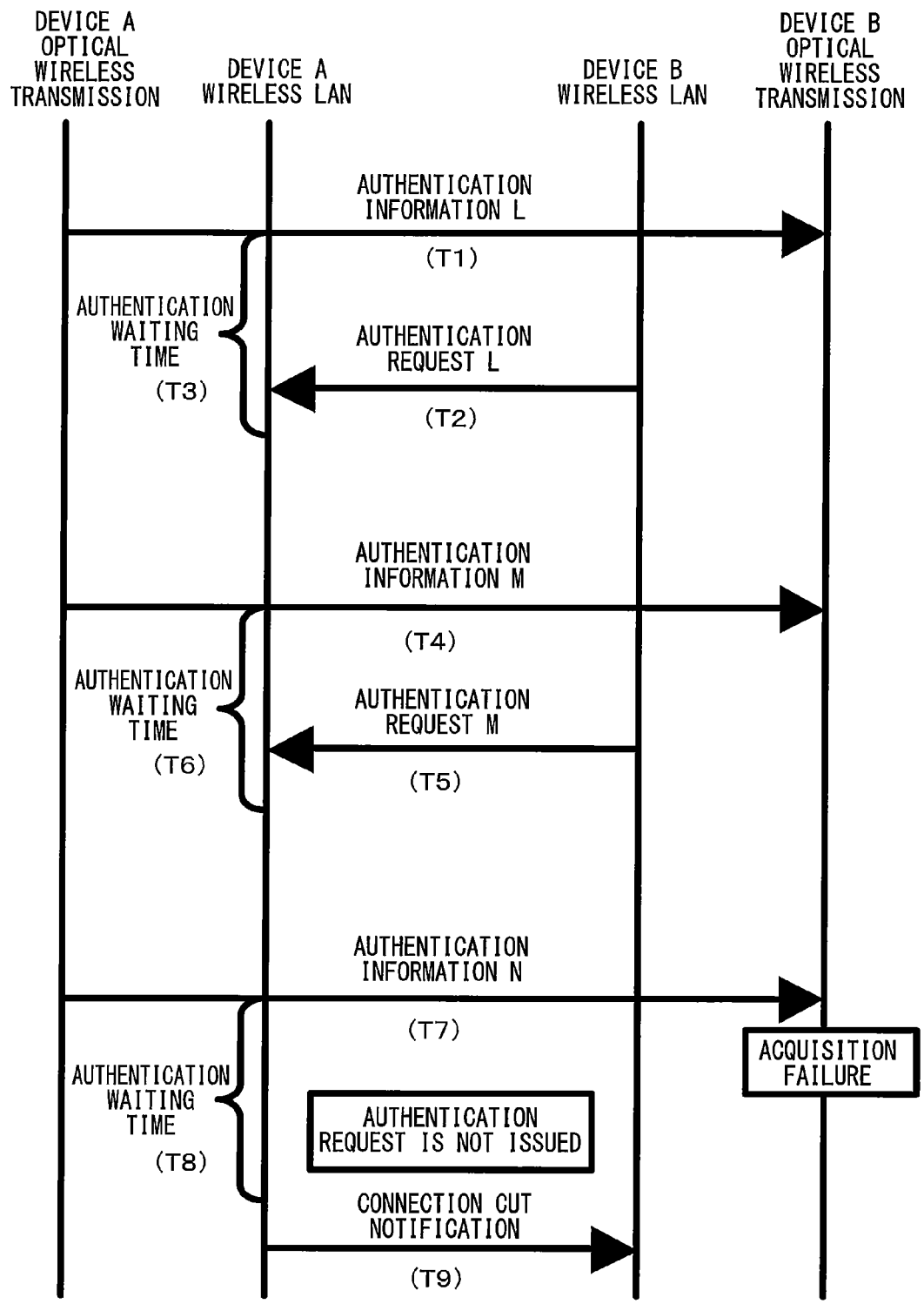
FIG. 9 is a schematic diagram showing a first modification example.

FIG. 9 is a schematic diagram showing the first modification example. Here, a device A in FIG. 9 corresponds to the server device 300, and a device B in FIG. 9 corresponds to the client device 400. An optical wireless transmission in FIG. 9 corresponds to the first communication function, and a wireless LAN in FIG. 9 corresponds to the second communication function.

In FIG. 9, when the device A periodically or not periodically updates the authentication information, the device A transmits the updated authentication information L to the device B through the optical wireless transmission (T1). Upon receiving the authentication information L through the optical wireless transmission, the device B issues an authentication request L containing new authentication information L through the wireless LAN (T2). Since the authentication request L is received by the device A in a shorter time than an authentication waiting time (T3), provision of a service is continued here.

Subsequently, when the device A updates the authentication information, the device A transmits the updated authentication information M to the device B through the optical wireless transmission (T4). Upon receiving the authentication information M through the optical wireless transmission, the device B issues an authentication request M containing new authentication information M through the wireless LAN (T5). Since the authentication request M is received by the device A in a shorter time than an authentication waiting time (T6), provision of the service is also continued here.

Subsequently, when the device A updates the authentication information, the device A transmits updated authentication information N to the device B through the optical wireless transmission (T7). The device B attempts to receive the authentication information N through the optical wireless transmission but fails, and cannot issue an authentication request N. Since the authentication request N is not received by the device A within an authentication waiting time (T8), provision of the service is suspended, and the device A transmits a notification indicating to that effect to the device B through the wireless LAN (T9).

In this manner, only in a state where the server device and the client device are always within a certain distance from each other and acquisition of authentication information can be performed through the optical wireless communication, provision of the service by the server device via the wireless LAN can be received. Accordingly, security can be improved.

The above embodiments may be realized by causing a CPU to execute a program stored in a storage device (ROM, RAM, hard disk, or the like), which program allows the CPU to perform the above-described process steps. In this case, the program may be executed after being stored in the storage device via a storage medium, or the program may be directly executed on the storage medium. Here, the storage medium may be, for example: a semiconductor memory such as a ROM, RAM, flash memory, or the like; a magnetic disk memory such as a flexible disk, hard disk, or the like; an optical disc such as a CD-ROM, DVD, BD, or the like; and a memory card. Here, the storage medium may also be a communication medium such as a telephone line or transmission path.

The function blocks in the server device 100 and the client device 200 and the function blocks in the server device 300 and the client device 400 are realized as an integrated circuit such as LSIs. Further, the function blocks each may be realized as an individual chip, or a chip which partly or entirely includes these function blocks may be provided. Although these chips are referred to as LSIs, they may be ICs, system LSIs, super LSIs, or ultra LSIs, depending on an integration density thereof.

A method for circuit integration is not limited to LSI. The circuit integration may be realized using a dedicated circuit or a general-purpose processor. For example, an FPGA (Field Programmable Gate Array), which can be programmed after LSI production, or a reconfigurable processor, which enables connection or settings of circuit cells in LSI to be reconfigured, may be used.

Further, if a new circuit integration technology that replaces the LSI technology is developed as a result of an advance in the semiconductor technology, or is developed based on a technology derived from the semiconductor technology, the function blocks may, of course, be integrated using such a technology. Specifically, there is a possibility of application of biotechnology or the like.

A communication system incorporating the present invention may be in the form of an adaptor which converts a signal interface, such as an Ethernet interface, IEEE1394 interface, USB interface or the like, into an interface for power line communication. This enables the communication system to be connected to multimedia apparatuses, such as a personal computer, DVD recorder, digital television, home server system and the like, which have various types of interfaces. This allows a network system, which is able to transmit, with a high speed, digital data such as multimedia data or the like by using a power line as a medium, to be constructed. As a result, unlike a conventional wired LAN, there is no necessity to newly place a network cable, and a power line already provided in homes, offices or the like can be used as a network line. Therefore, the present invention is considerably useful in terms of cost and ease of installation.

If, in the future, functions including the present invention are incorporated into multimedia apparatuses such as a personal computer, DVD recorder, digital television, home server system and the like, data transfer to be performed between the multimedia apparatuses via power codes thereof will be enabled. In this case, an adaptor, Ethernet cable, IEEE1394 cable, USB cable and the like are no longer necessary, and thus wiring is simplified. Further, these apparatuses can be connected to the Internet via a rooter. Also, these apparatuses can be connected to a wireless LAN or a conventional wired LAN via a hub or the like. Therefore, there is no problem in extending the present invention.

In a power line transmission scheme, communication data is transmitted via a power line. Therefore, unlike a wireless LAN, the power line transmission scheme does not have a problem in that a radio wave is intercepted whereby data leakage is caused. Therefore, the power line transmission scheme is effective for data protection in terms of security. Of course, data transferred on a power line is protected by, for example, an IPSec in IP, content encryption, or other DRM (Digital Rights Management) schemes.

Thus, high-quality AV content transmission using a power line is achieved by having QoS (quality of service) functions which include a copyright protection function using content encryption and effects of the present invention (throughput enhancement and band allocation which flexibly responds to an increase in retransmission or a traffic change).

Details of the present invention have been described above. However, the above-mentioned description is completely illustrative from every point of view, and does not limit the scope of the present invention. Therefore, various improvements and modifications can be performed without departing from the scope of the present invention.

[Discussion of Technical Feature]

Figure 10:
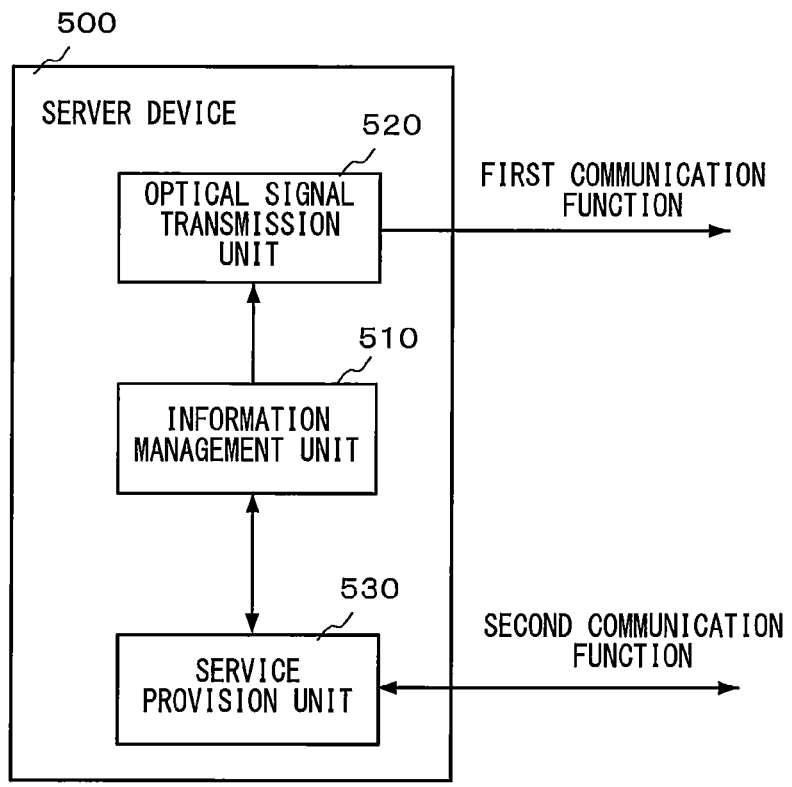
FIG. 10 is a schematic diagram showing a server device having a technical feature common to the above embodiments and the above modification example.

FIG. 10 is a schematic diagram showing a server device having a technical feature common to the above embodiments and the above modification example.

A server device 500 shown in FIG. 10 corresponds to the server device 100 in the first embodiment, the server device 300 in the second embodiment, and the device A in the first modification example, and provides services to various client devices.

The server device 500 includes an information management unit 510, an optical signal transmission unit 520, and a service provision unit 530.

The information management unit 510 corresponds to the connection information management unit 110 in the first embodiment and in the second embodiment, stores and manage a plurality of types of connection information which have different importance levels, respectively, associated with the respective importance levels, the connection information being necessary for connection to a service provided by the server device.

The optical signal transmission unit 520 corresponds to the optical signal transmission unit 120 in the first embodiment and the optical signal transmission unit 320 in the second embodiment, and modulates the plurality of types of connection information stored in the information management unit 510 into optical signals, such that a type of connection information stored in association with a higher importance level has a smaller amount of change in light intensity. The optical signal transmission unit 520 transmits the optical signals by use of the first communication function. Here, the first communication function means a function, such as an optical wireless transmission, that performs directional wireless communication whose communication state varies to a great extent depending on the environment.

The service provision unit 530 corresponds to the service provision unit 130 in the first embodiment and in the second embodiment. The service provision unit 530 has an automatic authentication function which performs automatic authentication when a client device has issued a connection request containing a predetermined type of connection information among the plurality of types of connection information by use of the second communication function which is different from the first communication function, the automatic authentication being for providing a service to the client device by use of the connection information. Here, the second communication function means a function that performs wireless or wired communication that is not so directional and whose communication state is relatively stable, as in wireless LAN communication.

The predetermined type of connection information in the server device 500 may be authentication information necessary for authentication when the service is to be provided. Here, when a client device has issued a connection request not containing the authentication information by used of the second communication function, the service provision unit 530 may request the authentication information from the client device before providing the service, and may receive the authentication information from the client device.

Further, one of the plurality of types of connection information in the server device 500 is connection destination specifying information which is necessary for specifying a server device to which a client device is to be connected. The connection request may be issued from the client device to a server device specified based on the connection destination specifying information. Here, the information management unit may store the authentication information associated with a higher importance level than that of the connection destination specifying information.

Figure 11:
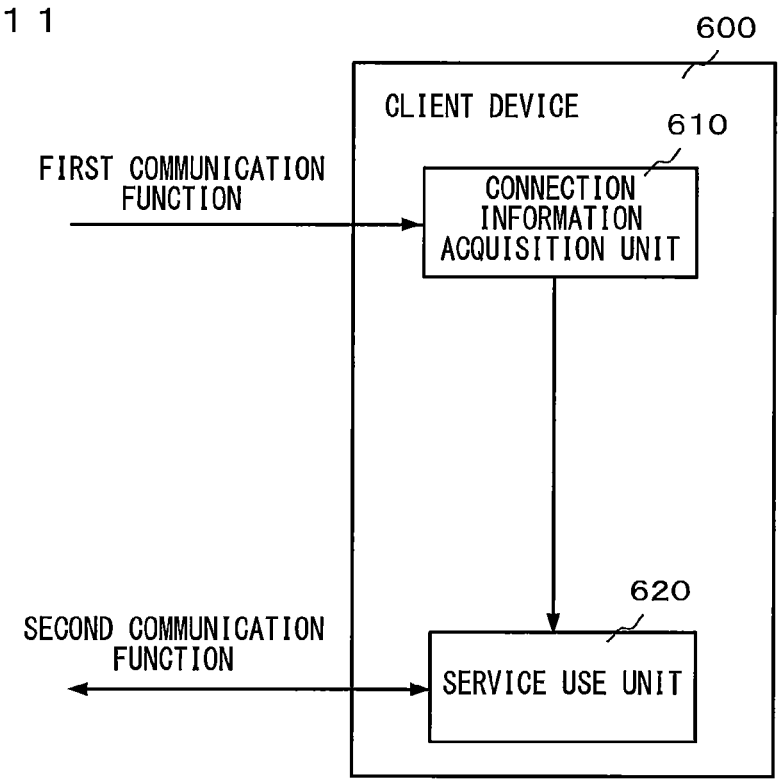
FIG. 11 is a schematic diagram showing a client device having a technical feature common to the above embodiments and the above modification example.

FIG. 11 is a schematic diagram showing a client device having a technical feature common to the above embodiments and the above modification example.

A client device 600 shown in FIG. 11 corresponds to the client device 200 in the first embodiment, the client device 400 in the second embodiment, and the device B in the first modification example, and receives provision of services from various server devices.

The client device 600 includes a connection information acquisition unit 610 and a service use unit 620.

The connection information acquisition unit 610 corresponds to the connection information acquisition unit 210 in the first embodiment and the connection information acquisition unit 410 in the second embodiment. The connection information acquisition unit 610 receives optical signals by use of the first communication function, the optical signals having been obtained by a server device modulating a plurality of types of connection information which have different importance levels, respectively, the connection information being necessary for connection to a service provided by the server device, such that a type of connection information associated with a higher importance level has a smaller amount of change in light intensity. The connection information acquisition unit 610 demodulates the received optical signals and attempts to acquire the plurality of types of connection information.

The service use unit 620 corresponds to the service use unit 220 in the first embodiment and in the second embodiment. When the connection information acquisition unit 610 has acquired a predetermined type of connection information, the service use unit 620 transmits a connection request containing the predetermined type of connection information to a corresponding server device by use of the second communication function, thereby receiving provision of a service.

The predetermined type of connection information in the client device 600 may be authentication information which is necessary for authentication when a service is to be provided. Here, in a case where the connection information acquisition unit 610 has acquired connection destination specifying information and has failed to acquire authentication information, the service use unit 620 transmits a connection request not containing authentication information to a server device specified based on the connection destination specifying information, and causes an authentication operation to be performed by the user, thereby receiving the provision of the service.

Further, one of the plurality of types of connection information in the client device 600 is connection destination specifying information that is necessary for specifying a server device to which the client device 600 is to be connected. The authentication information may be associated with a higher importance level than that of the connection destination specifying information. Here, in a case where the connection information acquisition unit has acquired connection destination specifying information and authentication information, the service use unit 620 may transmit a connection request containing the authentication information to a server device specified based on the connection destination specifying information.

Figure 12:
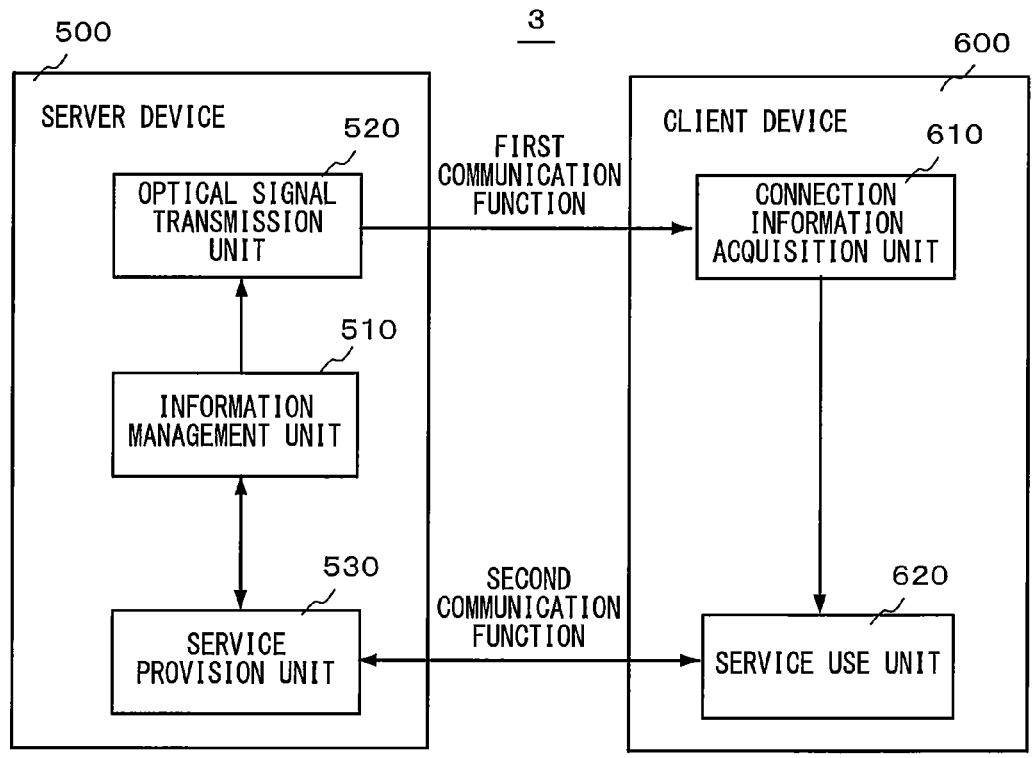
FIG. 12 is a schematic diagram showing a communication system having a technical feature common to the above embodiments and the above modification example.

FIG. 12 is a schematic diagram showing a communication system having a technical feature common to the above embodiments and the above modification example.

A communication system 3 shown in FIG. 12 corresponds to the communication system 1 in the first embodiment and the communication system 2 in the second embodiment, and includes the server device 500 and the client device 600. A service is provided from the server device 500 to the client device 600.

Figure 13:
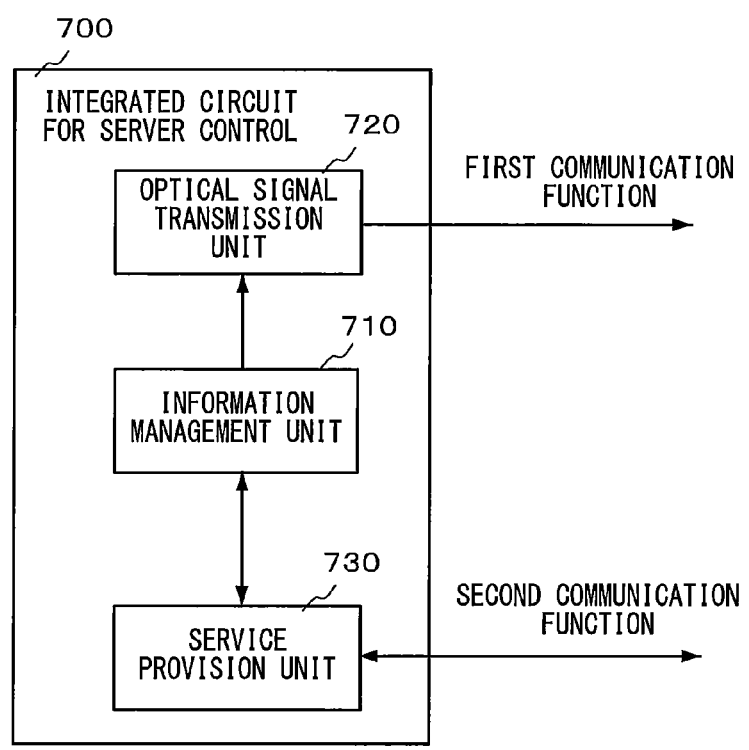
FIG. 13 is a schematic diagram showing an integrated circuit for server control having a technical feature common to the above embodiments and the above modification example.

FIG. 13 is a schematic diagram showing an integrated circuit for server control having a technical feature common to the above embodiments and the above modification example.

An integrated circuit for server control 700 shown in FIG. 13 is one of electronic components used in the server device 500 which provides a service to the client device 600.

The integrated circuit for server control 700 includes an information management unit 710, an optical signal transmission unit 720, and a service provision unit 730, which are integrated on a semiconductor chip.

The information management unit 710 is a part of the integrated circuit and has a similar function to that of the information management unit 510.

The optical signal transmission unit 720 is a part of the integrated circuit and has a similar function to that of the optical signal transmission unit 520.

The service provision unit 730 is a part of the integrated circuit and has a similar function as that of the service provision unit 530.

Figure 14:
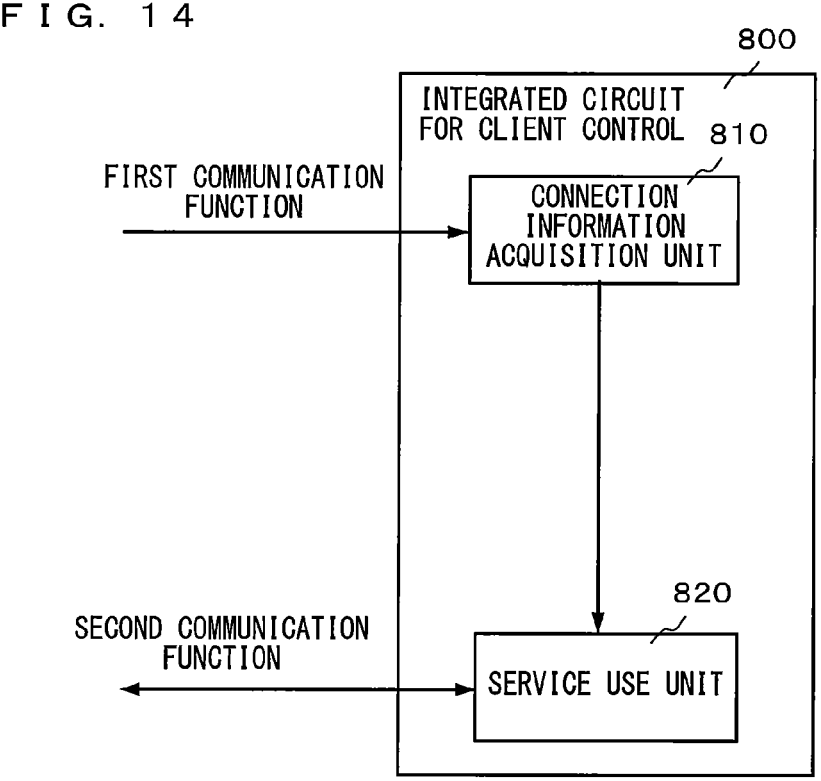
FIG. 14 is a schematic diagram showing an integrated circuit for client control having a technical feature common to the above embodiments and the above modification example.

FIG. 14 is a schematic diagram showing an integrated circuit for client control having a technical feature common to the above embodiments and the above modification example.

An integrated circuit for client control 800 shown in FIG. 14 is one of electronic components used in the client device 600 which receives provision of a service from the server device 500.

The integrated circuit for client control 800 includes a connection information acquisition unit 810 and a service use unit 820, which are integrated on a semiconductor chip.

The connection information acquisition unit 810 is a part of the integrated circuit and has a similar function as that of the connection information acquisition unit 610.

The service use unit 820 is a part of the integrated circuit and has a similar function as that of the service use unit 620.

Figure 15:
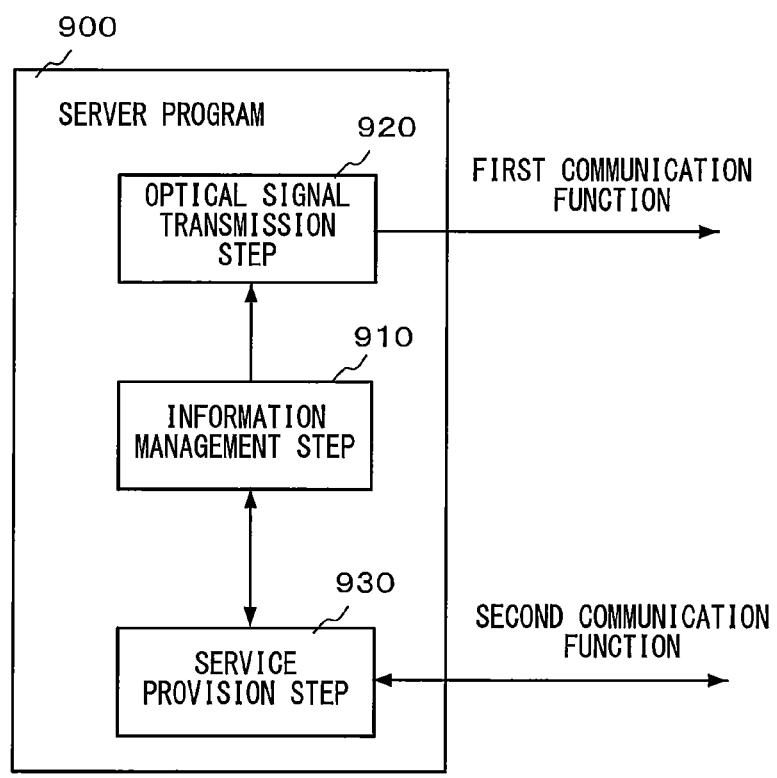
FIG. 15 is a schematic diagram showing a server program having a technical feature common to the above embodiments and the above modification example.

FIG. 15 is a schematic diagram showing a server program having a technical feature common to the above embodiments and the above modification example.

A server program 900 shown in FIG. 15 is information that indicates process steps stored in a storage medium X, and is executed by the server device 500 which provides a service to the client device 600.

The server program 900 includes an information management step 910, an optical signal transmission step 920, and a service provision step 930.

The server device 500 executes the information management step 910, thereby exhibiting a similar function to that of the information management unit 510.

The server device 500 executes the optical signal transmission step 920, thereby exhibiting a similar function to that of the optical signal transmission unit 520.

The server device 500 executes the service provision step 930, thereby exhibiting a similar function to that of the service provision unit 530.

Figure 16:
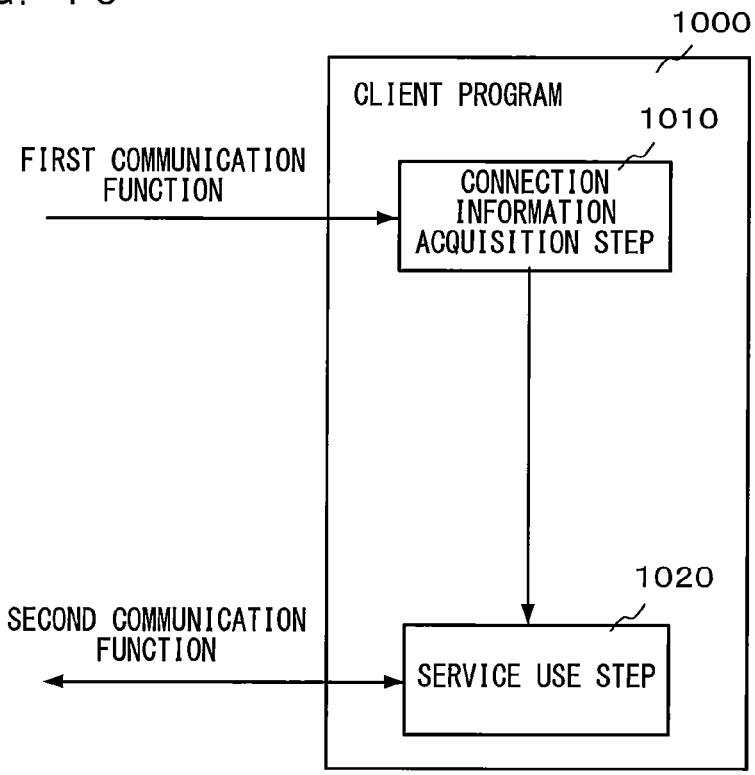
FIG. 16 is a schematic diagram showing a client program having a technical feature common to the above embodiments and the above modification example.

FIG. 16 is a schematic diagram showing a client program having a technical feature common to the above embodiments and the above modification example.

A client program 1000 shown in FIG. 16 is information that indicates process steps stored in a storage medium Y, and is executed by the client device 600 which receives provision of a service from the server device 500.

The client program 1000 includes a connection information acquisition step 1010 and a service use step 1020.

The client device 600 performs the connection information acquisition step 1010, thereby exhibiting a similar function to that of the connection information acquisition unit 610.

The client device 600 performs the service use step 1020, thereby exhibiting a similar function to that of the service use unit 620.

Figure 17:
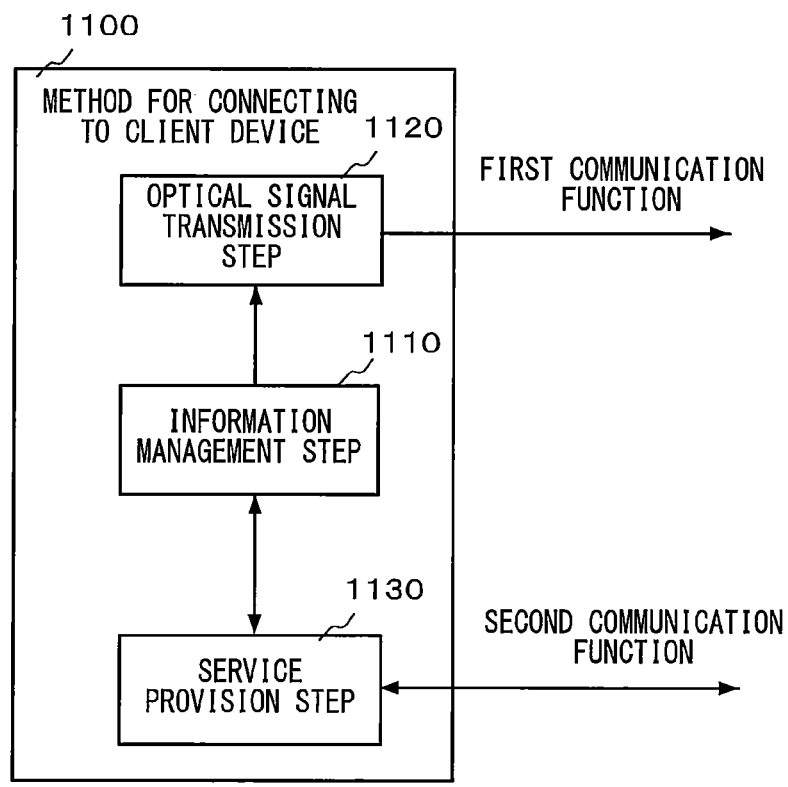
FIG. 17 is a schematic diagram showing a method for connecting to a client device having a technical feature common to the above embodiments and the above modification example.

FIG. 17 is a schematic diagram showing a method for connecting to a client device having a technical feature common to the above embodiments and the above modification example.

A method for connecting to a client device 1100 shown in FIG. 17 is performed in the server device 500 which provides a service to the client device 600.

The method for connecting to a client device 1100 includes an information management step 1110, an optical signal transmission step 1120, and a service provision step 1130.

The server device 500 performs the information management step 1110, thereby exhibiting a similar function to that of the information management unit 510.

The server device 500 performs the optical signal transmission step 1120, thereby exhibiting a similar function to that of the optical signal transmission unit 520.

The server device 500 performs the service provision step 1130, thereby exhibiting a similar function to that of the service provision unit 530.

Figure 18:
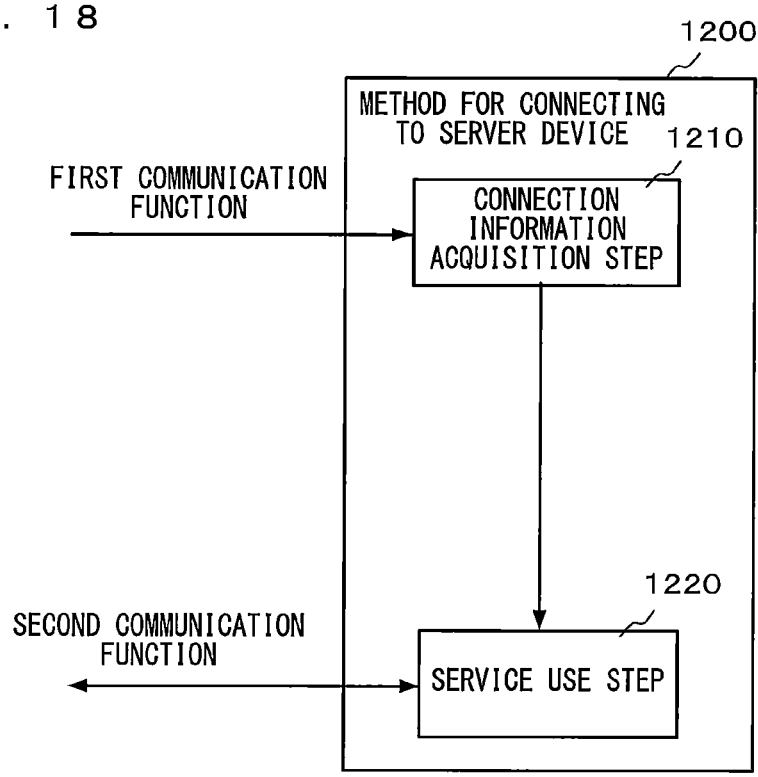
FIG. 18 is a schematic diagram showing a method for connecting to a server device having a technical feature common to the above embodiments and the above modification example.

FIG. 18 is a schematic diagram showing a method for connecting to a server device having a technical feature common to the above embodiments and the above modification example.

A method for connecting to a server device 1200 shown in FIG. 18 is performed in the client device 600 which receives provision of a service from the server device 500.

The method for connecting to a server device 1200 includes a connection information acquisition step 1210 and a service use step 1220.

The client device 600 performs the connection information acquisition step 1210, thereby exhibiting a similar function to that of the connection information acquisition unit 610.

The client device 600 performs the service use step 1220, thereby exhibiting a similar function to that of the service use unit 620.

Figure 19:
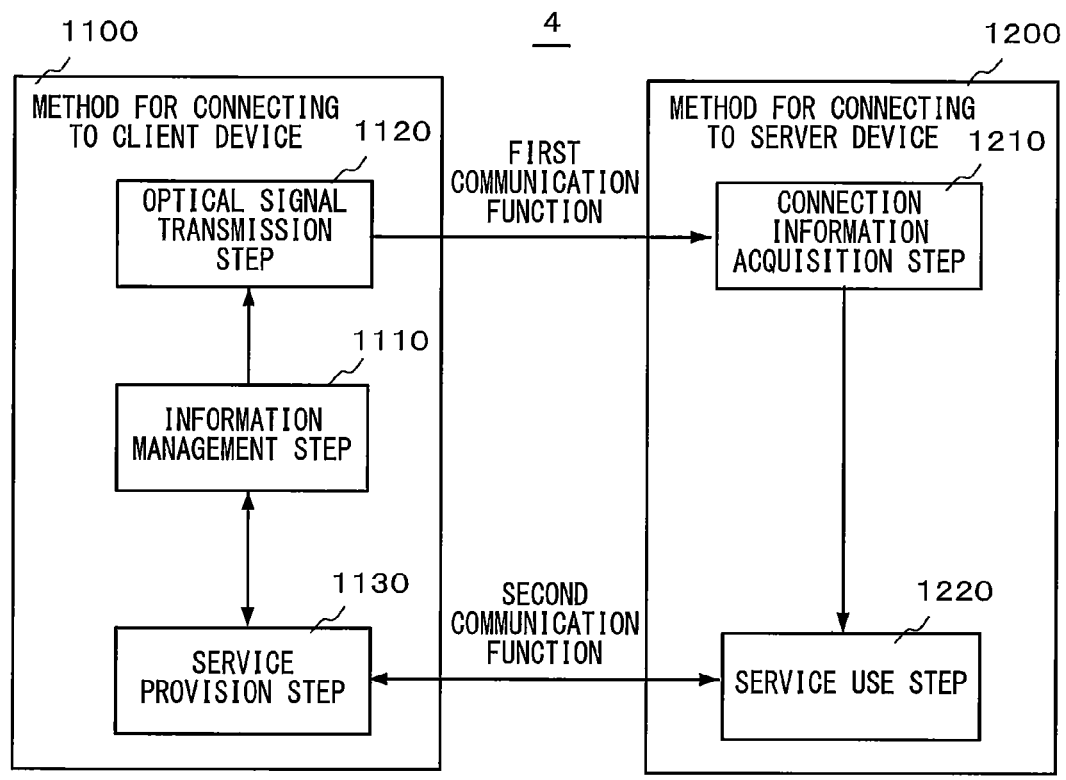
FIG. 19 is a schematic diagram showing a connection method in a communication system having a technical feature common to the above embodiments and the above modification example.

FIG. 19 is a schematic diagram showing a connection method in a communication system having a technical feature common to the above embodiments and the above modification example.

A connection method in a communication system 4 shown in FIG. 19 is performed in the communication system 3, and includes the method for connecting to a client device 1100 and the method for connecting to a server device 1200. A service is provided from the server device 500 to the client device 600.

INDUSTRIAL APPLICABILITY

The server device, client device, communication system, integrated circuit for server control, integrated circuit for client control, server program, client program, method for connecting to a client device, method for connecting to a server device, and communication system connection method according to the present invention can be used in household electrical appliances in a house such as a television, and in mobile apparatuses such as a mobile phone, the household appliances and the mobile apparatuses having a communication function to connect to a network; and are very useful since they can improve the convenience for the user while ensuring security, without requiring implementation of a high-performance terminal.

DESCRIPTION OF THE REFERENCE CHARACTERS 1 communication system
2 communication system 3 communication system
4 connection method in a communication system
100 server device
110 connection information management unit
120 optical signal transmission unit
121 per-resolution optical transmission control unit
122 light emitting element
130 service provision unit
131 LAN communication unit
132 connection management unit
133 authentication processing unit
200 client device
210 connection information acquisition unit
211 light receiving element
212 per-resolution optical reception control unit
220 service use unit
221 user confirmation unit
222 connection request unit
223 wireless LAN communication unit
300 server device
320 optical signal transmission unit
323 authentication division part
400 client device
410 connection information acquisition unit
413 authentication coupling unit
500 server device
510 information management unit
520 optical signal transmission unit
530 service provision unit
600 client device
610 connection information acquisition unit
620 service use unit
700 integrated circuit for server control
710 information management unit
720 optical signal transmission unit
730 service provision unit
800 integrated circuit for client control
810 connection information acquisition unit
820 service use unit
900 server program
910 information management step
920 optical signal transmission step
930 service provision step
1000 client program
1010 connection information acquisition step
1020 service use step
1100 method for connecting to a client device
1110 information management step
1120 optical signal transmission step
1130 service provision step
1200 method for connecting to a server device
1210 connection information acquisition step
1220 service use step

The invention claimed is:

1. A server device configured to provide a service to a client device, the server device comprising:
an information management unit that stores and manages a plurality of types of connection information which have different importance levels, respectively, in association with the respective importance levels, the connection information being necessary for connection to a service provided by the server device;
an optical signal transmission unit that modulates the plurality of types of connection information stored in the information management unit into optical signals, such that a type of connection information stored in association with a higher importance level has a smaller amount of change in light intensity, and repeatedly transmits the optical signals having the plurality of types of connection information, respectively, by use of a first communication function; and
a service provision unit that has an authentication function which performs authentication when the client device has issued a connection request containing a predetermined type of connection information among the plurality of types of connection information by use of a second communication function which is different from the first communication function, in accordance with the importance level of communication information of the connection request, the authentication being for providing the service to the client device.

2. The server device according to claim 1, wherein
the optical signal transmission unit allots a transmission section for each of the plurality of types of connection information, and transmits reference light having a maximum intensity that can be outputted at the beginning of the transmission section, and sets a range of the light intensity for the modulation in each transmission section based on the light intensity of the reference light.

3. The server device according to claim 1, wherein
one of the plurality of types of connection information is connection destination specifying information necessary for specifying a server device to which the client device is to be connected,
the connection request from the client device is issued to the server device specified based on the connection destination specifying information, and
the information management unit stores the authentication information in association with a higher importance level than that of the connection destination specifying information.

4. The server device according to claim 1, wherein
the predetermined type of connection information is authentication information necessary for authentication when the service is to be provided, and
when the client device has issued a connection request not containing the authentication information by use of the second communication function, the service provision unit requests the authentication information from the client device before providing the service, and receives the authentication information from the client device.

5. The server device according to claim 1, wherein
the optical signal transmission unit further divides each of the plurality of types of connection information, and transmits each piece of information obtained by the division with a time interval set in advance such that the client device has to be within a predetermined distance from the server device.

6. The server device according to claim 1, wherein
the information management unit further changes the plurality of types of connection information periodically or not periodically,
when the information management unit has changed the plurality of types of connection information, the optical signal transmission unit modulates the changed plurality of types of connection information into optical signals such that a type of connection information stored in association with a higher importance level has a smaller amount of change in light intensity, and transmits the optical signals by use of the first communication function, and
in a case where within a predetermined time period since the optical signal transmission unit has outputted the changed plurality of types of connection information, the client device provided with the service does not issue a connection request containing a predetermined type of connection information among the changed plurality of types of connection information, the service provision unit stops the provision of the service.

7. A client device configured to receive provision of a service from a server device, the client device comprising:
a connection information acquisition unit that receives optical signals by use of a first communication function, the optical signals having been obtained by the server device modulating a plurality of types of connection information which have different importance levels, respectively, the connection information being necessary for connection to a service provided by the server device, such that a type of connection information associated with a higher importance level has a smaller amount of change in light intensity, that demodulates the received optical signals, and that attempts to acquire the plurality of types of connection information; and
a service use unit that transmits, when the connection information acquisition unit has acquired a predetermined type of connection information, a connection request containing the predetermined type of connection information to the server device by use of a second communication function which is different from the first communication function, and that receives the provision of the service.

8. The client device according to claim 7, wherein
the predetermined type of connection information is authentication information which is necessary for authentication when the provision of the service is to be received,
in a case where the connection information acquisition unit has acquired the connection destination specifying information and has failed to acquire the authentication information, the service use unit transmits a connection request not containing the authentication information to a server device specified based on the connection destination specifying information, causes an authentication operation to be performed by a user, and receives the provision of the service.

9. The client device according to claim 8, wherein
one of the plurality of types of connection information is a connection destination specifying information which is necessary for specifying a server device to which the client device is to be connected,
the authentication information is associated with a higher importance level than that of the connection destination specifying information, and
in a case where the connection information acquisition unit has acquired the connection destination specifying information and the authentication information, the service use unit transmits a connection request containing the authentication information to a server device specified based on the connection destination specifying information.

10. The client device according to claim 7, wherein
the optical signals received by the connection information acquisition unit are allotted with transmission sections, respectively, according to the respective plurality of types of connection information, and reference light having a maximum intensity that can be outputted by the server device is transmitted at the beginning of each transmission section, and
the connection information acquisition unit calculates a resolution of each transmission section based on the ratio of the intensity of the reference light to the intensity of subsequent optical signals.

11. The client device according to claim 7, wherein
in a case where the connection information acquisition unit attempts to acquire the plurality of types of connection information, if the demodulated pieces of connection information are divided pieces of connection information, the connection information acquisition unit retains the demodulated pieces of connection information until receiving all of the pieces of connection information, and then couples corresponding pieces.

12. The client device according to claim 7, wherein
the plurality of types of connection information are changed periodically or not periodically, and
in a case where the connection information acquisition unit has acquired a predetermined type of connection information while the provision of the service is being received, the service use unit transmits a connection request containing the predetermined type of connection information to the server device by use of the second communication function.

13. A communication system that includes a server device and a client device, and in which a service is provided from the server device to the client device,
the server device comprising:
an information management unit that stores and manages a plurality of types of connection information which have different importance levels, respectively, in association with the respective importance levels, the connection information being necessary for connection to a service provided by the server device;
an optical signal transmission unit that modulates the plurality of types of connection information stored in the information management unit into optical signals, such that a type of connection information stored in association with a higher importance level has a smaller amount of change in light intensity, and repeatedly transmits the optical signals having the plurality of types of connection information, respectively, by use of a first communication function; and
a service provision unit that has an authentication function which performs authentication when the client device has issued a connection request containing a predetermined type of connection information among the plurality of types of connection information by use of a second communication function which is different from the first communication function, in accordance with the importance level of communication information of the connection request, the authentication being for providing the service to the client device,
the client device comprising:
a connection information acquisition unit that receives optical signals outputted by the optical signal transmission unit included in the server device by use of the first communication function, demodulates the received optical signals, and attempts to acquire the plurality of types of connection information; and
a service use unit that transmits, when the connection information acquisition unit has acquired the predetermined type of connection information, a connection request containing the predetermined type of connection information to the server device by use of the second communication function, and receives the provision of the service.

14. An integrated circuit for server control configured to be used by a server device that provides a service to a client device, the integrated circuit integrating circuits functioning as:
- an information management unit that manages a plurality of types of connection information which have different importance levels, respectively, in association with the respective importance levels, the connection information being necessary for connection to a service provided by the server device;
- an optical signal transmission unit that modulates the plurality of types of connection information managed by the information management unit into optical signals, such that a type of connection information stored in association with a higher importance level has a smaller amount of change in light intensity, and repeatedly transmits the optical signals having the plurality of types of connection information, respectively, by use of a first communication function; and
- a service provision unit that has an authentication function which performs authentication when the client device has issued a connection request containing a predetermined type of connection information among the plurality of types of connection information by use of a second communication function which is different from the first communication function, in accordance with the importance level of communication information of the connection request, the authentication being for providing the service to the client device.

15. An integrated circuit for client control configured to be used by a client device that receives provision of a service from a server device, the integrated circuit integrating circuits functioning as:
- a connection information acquisition unit that receives optical signals by use of a first communication function, the optical signals having been obtained by the server device modulating a plurality of types of connection information which have different importance levels, respectively, the connection information being necessary for connection to a service provided by the server device, such that a type of connection information associated with a higher importance level has a smaller amount of change in light intensity, that demodulates the received optical signals, and that attempts to acquire the plurality of types of connection information; and
- a service use unit that transmits, when the connection information acquisition unit has acquired a predetermined type of connection information, a connection request containing the predetermined type of connection information to the server device by use of a second communication function which is different from the first communication function, and that receives the provision of the service.

16. A server program configured to be executed by a server device that provides a service to a client device, the program causing the server device to perform:
- an information management step of managing a plurality of types of connection information which have different importance levels, respectively, in association with the respective importance levels, the connection information being necessary for connection to a service provided by the server device;
- an optical signal transmission step of modulating the plurality of types of connection information managed in the information management step into optical signals, such that a type of connection information stored in association with a higher importance level has a smaller amount of change in light intensity, and of repeatedly transmitting the optical signals having the plurality of types of connection information, respectively, by use of a first communication function; and
- a service provision step having an authentication function which performs authentication when the client device has issued a connection request containing a predetermined type of connection information among the plurality of types of connection information by use of a second communication function which is different from the first communication function, in accordance with the importance level of communication information of the connection request, the authentication being for providing the service to the client device.

17. A client program configured to be executed by a client device that receives provision of a service from a server device, the program causing the client device to perform:
- a connection information acquisition step of receiving optical signals by use of a first communication function, the optical signals having been obtained by the server device modulating a plurality of types of connection information which have different importance levels, respectively, the connection information being necessary for connection to a service provided by the server device, such that a type of connection information associated with a higher importance level has a smaller amount of change in light intensity, of demodulating the received optical signals, and of attempting to acquire the plurality of types of connection information; and
- a service use step of transmitting, when the connection information acquisition step has acquired a predetermined type of connection information, a connection request containing the predetermined type of connection information to the server device by use of a second communication function which is different from the first communication function, and of receiving the provision of the service.

18. A method for connecting to a client device performed by a server device that provides a service to a client device, the method comprising:
- an information management step of managing a plurality of types of connection information which have different importance levels, respectively, in association with the respective importance levels, the connection information being necessary for connection to a service provided by the server device;
- an optical signal transmission step of modulating the plurality of types of connection information managed in the information management step into optical signals, such that a type of connection information stored in association with a higher importance level has a smaller amount of change in light intensity, and of repeatedly transmitting the optical signals having the plurality of types of connection information, respectively, by use of a first communication function; and
- a service provision step having an authentication function which performs authentication when the client device has issued a connection request containing a predetermined type of connection information among the plurality of types of connection information by use of a second communication function which is different from the first communication function, in accordance with the importance level of communication information of the connection request, the authentication being for providing the service to the client device.

19. A method for connecting to a server device performed by a client device that receives provision of a service from a server device, the method comprising:
- a connection information acquisition step of receiving optical signals by use of a first communication function, the optical signals having been obtained by the server device modulating a plurality of types of connection information which have different importance levels, respectively, the connection information being necessary for connection to a service provided by the server device, such that a type of connection information associated with a higher importance level has a smaller amount of change in light intensity, of demodulating the received optical signals, and of attempting to acquire the plurality of types of connection information; and
- a service use step of transmitting, when the connection information acquisition step has acquired a predetermined type of connection information, a connection request containing the predetermined type of connection information to the server device by use of a second communication function which is different from the first communication function, and of receiving the provision of the service.

20. A connection method in a communication system that includes a server device and a client device, and in which a service is provided from the server device to the client device, the method comprising:
- an information management step, performed in the server device, of managing a plurality of types of connection information which have different importance levels, respectively, in association with the respective importance levels, the connection information being necessary for connection to a service provided by the server device;
- an optical signal transmission step, performed in the server device, of modulating the plurality of types of connection information managed in the information management step into optical signals, such that a type of connection information stored in association with a higher importance level has a smaller amount of change in light intensity, and of repeatedly transmitting the optical signals having the plurality of types of connection information, respectively, by use of a first communication function;
- a service provision step, performed in the server device, having an authentication function which performs authentication when the client device has issued a connection request containing a predetermined type of connection information among the plurality of types of connection information by use of a second communication function which is different from the first communication function, in accordance with the importance level of communication information of the connection request, the authentication being for providing the service to the client device,
- a connection information acquisition step, performed in the client device, of receiving optical signals outputted by an optical signal transmission unit included in the server device by use of the first communication function, of demodulating the received optical signals, and of attempting to acquire the plurality of types of connection information; and
- a service use step, performed in the client device, of transmitting, when the connection information acquisition step has acquired a predetermined type of connection information, a connection request containing the predetermined type of connection information to the server device by use of the second communication function, and of receiving the provision of the service.

* * * * *